United States Patent
Fujii et al.

(10) Patent No.: US 8,974,947 B2
(45) Date of Patent: Mar. 10, 2015

(54) ELECTRIC STORAGE DEVICE AND ITS PRODUCTION METHOD

(75) Inventors: Tsutomu Fujii, Tokyo (JP); Osamu Hatozaki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 982 days.

(21) Appl. No.: 12/662,007

(22) Filed: Mar. 26, 2010

(65) Prior Publication Data
US 2010/0255356 A1 Oct. 7, 2010

(30) Foreign Application Priority Data
Mar. 27, 2009 (JP) .................................. 2009-079114

(51) Int. Cl.
| | |
|---|---|
| *H01M 6/10* | (2006.01) |
| *H01M 6/00* | (2006.01) |
| *H01G 9/00* | (2006.01) |
| *H01M 10/0525* | (2010.01) |
| *H01G 9/008* | (2006.01) |
| *H01G 9/022* | (2006.01) |
| *H01G 9/04* | (2006.01) |
| *H01G 11/06* | (2013.01) |
| *H01G 11/12* | (2013.01) |

(Continued)

(52) U.S. Cl.
CPC ............ *H01M 10/0525* (2013.01); *H01G 9/016* (2013.01); *H01G 9/038* (2013.01); *H01G 9/058* (2013.01); *H01G 9/155* (2013.01); *H01G 11/06* (2013.01); *H01G 11/12* (2013.01); *H01G 11/24* (2013.01); *H01G 11/62* (2013.01); *H01G 11/70* (2013.01); *H01M 4/133* (2013.01); *H01M 4/742* (2013.01); *H01M 4/745* (2013.01);
*H01M 12/005* (2013.01); *H01M 2004/021* (2013.01); *Y02E 60/122* (2013.01); *Y02E 60/13* (2013.01); *Y02T 10/7011* (2013.01); *Y02T 10/7022* (2013.01)
USPC ............ 429/149; 429/94; 429/162; 29/623.1; 361/502

(58) Field of Classification Search
USPC ............. 429/94, 149, 152, 162, 231.7, 231.8; 361/502; 29/623.1
See application file for complete search history.

(56) References Cited

U.S. PATENT DOCUMENTS

2008/0176142 A1* 7/2008 Inagaki et al. ................ 429/330
2008/0299455 A1* 12/2008 Shiozaki et al. .............. 429/209

(Continued)

FOREIGN PATENT DOCUMENTS

| JP | 2007-91557 | 4/2007 |
| JP | 2008-150270 | 7/2008 |

*Primary Examiner* — Carlos Barcena
(74) *Attorney, Agent, or Firm* — McGinn IP Law Group, PLLC

(57) ABSTRACT

When an electrode material having a weight-average mesopore/macropore specific surface area within a specific range is used, there arises an expansion of a cell caused by the generation of decomposed gas from a component of electrolyte solution during the pre-doping process of lithium ions. A potential drop upon the pre-doping process is adjusted so as to reduce or suppress the expansion of the cell. Specifically, since the pre-doping speed is increased, the negative electrode can speedily reach the potential by which an SEI component made of lithium alkyl carbonate can be produced on the surface of the negative electrode. Consequently, the absolute amount of the gas produced by the decomposition of the electrolyte solution can be reduced, whereby the expansion of the electric storage device can be reduced.

20 Claims, 11 Drawing Sheets

Number of negative electrodes to one lithium electrode: 2

(51) Int. Cl.
*H01G 11/24* (2013.01)
*H01G 11/62* (2013.01)
*H01G 11/70* (2013.01)
*H01M 4/133* (2010.01)
*H01M 4/74* (2006.01)
*H01M 12/00* (2006.01)
*H01M 4/02* (2006.01)

(56) References Cited

U.S. PATENT DOCUMENTS

2009/0029257 A1\* 1/2009 Ando et al. ............... 429/231.95
2009/0214955 A1\* 8/2009 Utsunomiya et al. .... 429/231.95
2009/0246624 A1\* 10/2009 Kojima et al. ................ 429/207

\* cited by examiner

Fig. 1
Fig. 1A
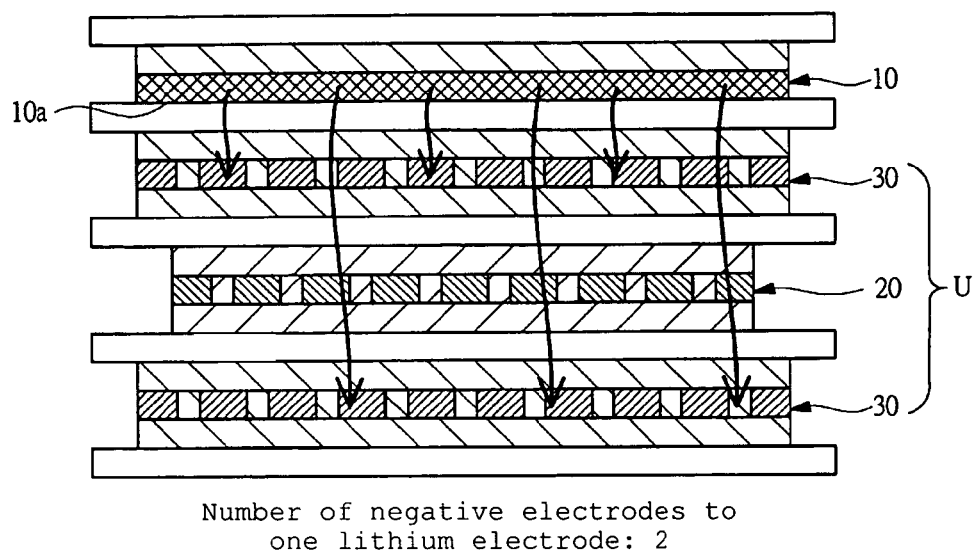
Number of negative electrodes to
one lithium electrode: 2
Fig. 1B
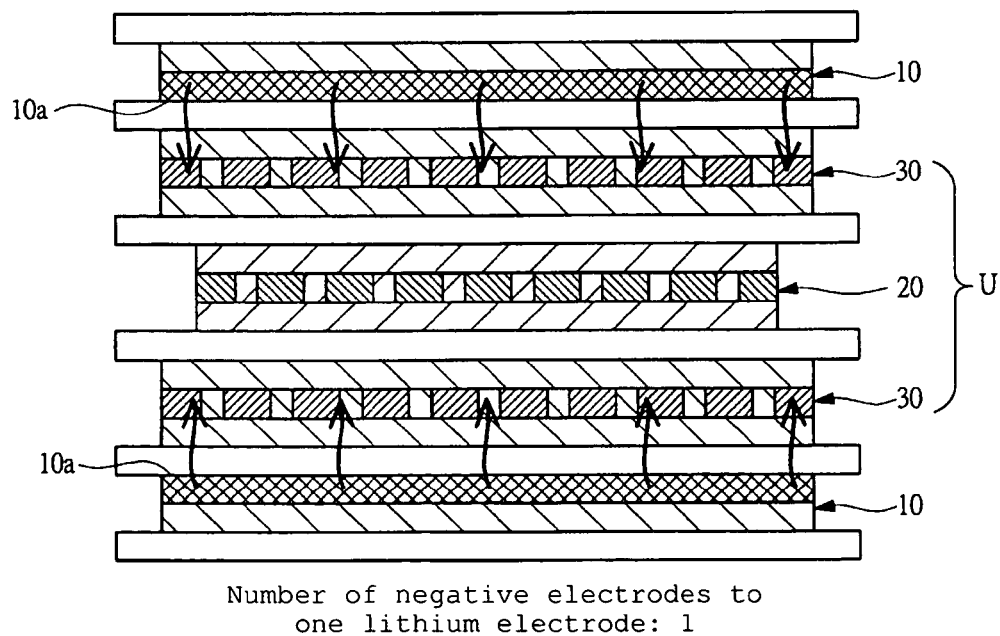
Number of negative electrodes to
one lithium electrode: 1

Number of negative electrodes to one lithium electrode: 16

Number of negative electrodes to one lithium electrode: 8

Number of negative electrodes to one lithium electrode: 4

Number of negative electrodes to one lithium electrode: 3

FIG. 8
Fig. 8A
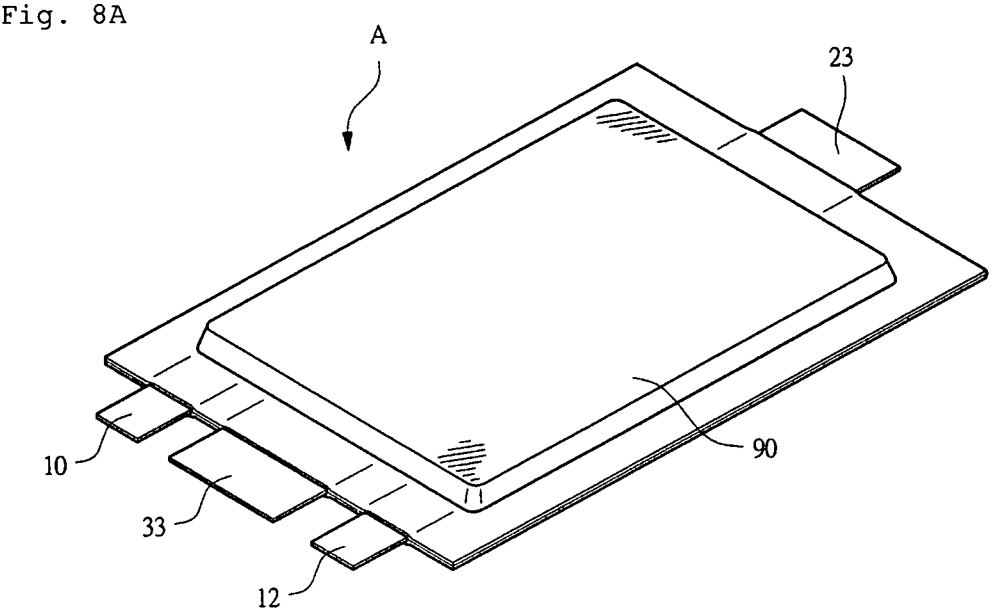
Fig. 8B
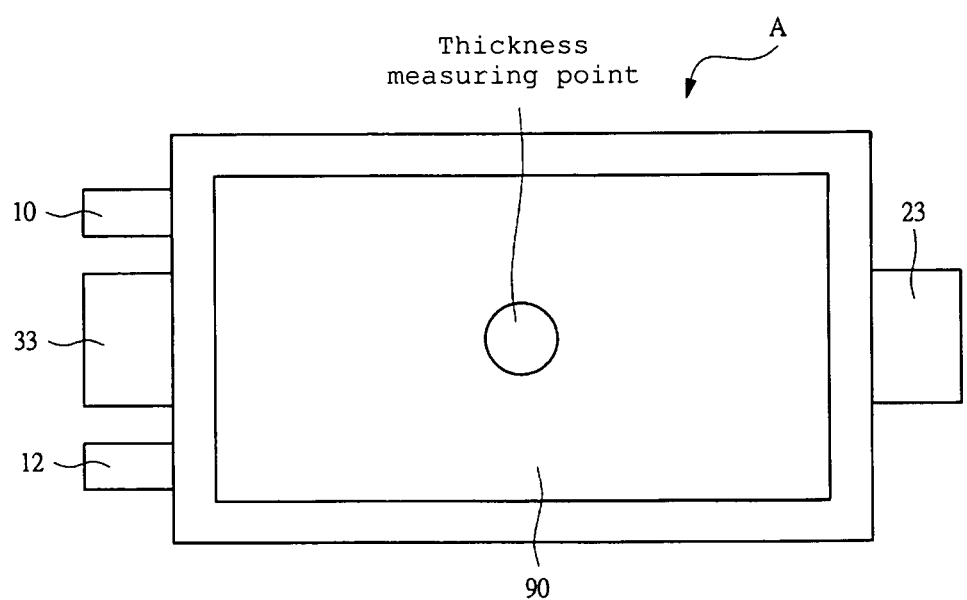

FIG. 9

| | Weight-average mesopore/macropore specific surface area of negative electrode material (m²/g) | Number of negative electrode to one lithium electrode | Combined air permeability (sec/100 mL) | Numerical index X |
|---|---|---|---|---|
| Experimental Example 1 | 38 | 16 | 275 | 39 |
| Experimental Example 2 | 38 | 8 | 274 | 20 |
| Experimental Example 3 | 38 | 4 | 272 | 10 |
| Experimental Example 4 | 38 | 3 | 270 | 7 |
| Experimental Example 5 | 38 | 12 | 9535 | 48 |
| Experimental Example 6 | 38 | 8 | 9539 | 32 |
| Experimental Example 7 | 38 | 4 | 9530 | 16 |
| Experimental Example 8 | 38 | 8 | 16520 | 34 |
| Experimental Example 9 | 38 | 4 | 16522 | 17 |
| Experimental Example 10 | 11 | 8 | 16534 | 34 |
| Experimental Example 11 | 11 | 8 | 9540 | 32 |
| Experimental Example 12 | 11 | 4 | 9551 | 16 |
| Experimental Example 13 | 11 | 16 | 280 | 39 |
| Experimental Example 14 | 11 | 8 | 280 | 20 |
| Experimental Example 15 | 11 | 4 | 278 | 10 |
| Comparative Example 1 | 38 | 16 | 16532 | 67 |
| Comparative Example 2 | 38 | 16 | 9550 | 64 |
| Comparative Example 3 | 38 | 12 | 16532 | 51 |
| Comparative Example 4 | 11 | 16 | 9548 | 64 |
| Comparative Example 5 | 11 | 16 | 16530 | 67 |
| Comparative Example 6 | 5 | 16 | 16532 | 67 |

(Number of negative electrode to one lithium electrode) x log (combined air permeability)

(Number of negative electrode to one lithium electrode) x log (combined air permeability)

FIG. 16

|  | Experimental Example 18 | Experimental Example 25 | Experimental Example 26 | Comparative Example 11 |
| --- | --- | --- | --- | --- |
| Weight-average mesopore/ macropore specific surface area of negative electrode material ($m^2/g$) | 38 | 11 | 26 | 5 |
| Charging/discharging capacity upon discharging at 0.4 A | 28.3 | 28.6 | 28.6 | 28.9 |
| Disharging capacity upon discharging at 25.0 A | 17.6 | 15.9 | 17.5 | 13.8 |
| Ratio of discharging capacity at 25.0 A and 0.4 A | 0.621 | 0.556 | 0.611 | 0.477 |
| Charging capacity upon charging at 8.0 A | 23.1 | 23.3 | 24.3 | 21.0 |
| Ratio of charging capacity at 8.0 A to 0.4 A | 0.830 | 0.816 | 0.850 | 0.743 |

FIG. 17

|  | Experimental Example 18 | Experimental Example 25 | Experimental Example 26 | Comparative Example 11 |
| --- | --- | --- | --- | --- |
| Weight-average mesopore/ macropore specific surface area of negative electrode material ($m^2/g$) | 38 | 11 | 26 | 5 |
| Discharging DC resistance | 21.4 | 23.4 | 21.3 | 38.5 |
| Charging DC resistance | 29.4 | 29.3 | 21.7 | 43.2 |

ELECTRIC STORAGE DEVICE AND ITS PRODUCTION METHOD

CROSS-REFERENCE TO RELATED APPLICATIONS

The present application claims priority from Japanese Patent Application No. 2009-079114 filed on Mar. 27, 2009, and is hereby incorporated by reference in its entirety.

BACKGROUND OF THE INVENTION

1. Field of the Invention

The present invention relates to an electric storage device, and its production method, and more particularly to a technique well adaptable to reduce and suppress the expansion of an electric storage device, which is caused by the generation of decomposed gas from a component of electrolyte solution, in case where a material having a weight-average mesopore/macropore specific surface area within a specific range is used for an electrode material.

2. Description of the Related Art

The technique described below has been studied for completing the present invention. The summary is as follows.

Nowadays, an environmental issue, specifically vehicle-exhaust gas emission, is widely talked about. In this situation, efforts are made of developing environment-friendly electric vehicles and the like. In the electric vehicle development, a strong development effort is focused on an electric storage device to be used as a power source. Many types of electric storage devices have been proposed for replacement of the conventional lead battery.

There is a lithium ion secondary battery or an electric double layer capacitor as the electric storage device. In particular, a hybrid capacitor including a lithium ion capacitor having lithium ions doped into a negative electrode beforehand is now attracting attention. Some of the hybrid capacitors are actually mounted to a vehicle, and an execution test is performed in order to put the hybrid capacitor into practical use. Meanwhile, a further development in the components of the electric storage device has been carried out.

The development of the components described above includes the development in an electrode material, for example. For example, Japanese Patent Application Laid-Open (JP-A) No. 2008-150270 describes that a carbon material obtained by burning a carbon precursor, which is an aggregate powder of a carbon particle to which a carbon black having an average particle diameter of 12 to 300 nm is bonded, is cheap and has an excellent charging/discharging characteristic as a negative electrode material. JP-A No. 2007-91557 discloses an invention relating to an improvement of a high input/output characteristic of a lithium ion secondary battery. JP-A No. 2007-91557 describes that a carbon material, in which a total specific surface area obtained according to a BET method and a specific surface area of mesopore area obtained according to a BJH method fall within the range of 10 to 40 $m^2/g$ respectively, and the ratio of the mesopore specific surface area to the total specific surface area is 0.7 or more, has an effect of improving the high input/output characteristic.

The present inventors have been studying an electrode material of an electric storage device for a long time. The present inventors have found in their study that the introduction of a concept of a weight-average mesopore/macropore specific surface area to a negative electrode material is effective for improving the input/output characteristic. When the weight-average mesopore/macropore specific surface area of a negative electrode material is set to fall within a specific range, an excellent charging/discharging characteristic, particularly an excellent input/output characteristic, can be obtained even with the materials described in JP-A Nos. 2008-150270 and 2007-91557. In other words, although the feature of the negative electrode material is set within the scope of the claims in JP-A Nos. 2008-150270 and 2007-91557, an expected effect cannot always be obtained. On the other hand, when the weight-average mesopore/macropore specific surface area of the negative electrode material is a specific value or more, the electric storage device might expand due to the generation of the decomposed gas from a component of electrolyte solution, in some cases. The significant expansion of the electric storage device, which is caused in some cases, might cause a leakage of the electrolyte solution that has corrosivity or a leakage of gas because the electric storage device is opened.

SUMMARY OF THE INVENTION

The present invention aims to provide a technique of reducing and suppressing the expansion of the electric storage device, which is caused by the generation of the decomposed gas from the component of the electrolyte solution, whereby the material having the weight-average mesopore/macropore specific surface area in a specific range can be safely used as an electrode material. Further, the present invention aims to provide an electric storage device having an excellent charging/discharging characteristic.

The foregoing and other purposes and novel features of the present invention will be clarified from the description of the specification of the present application and the attached drawings.

A representative aspect, among the aspects described in the present application, will be briefly explained. When an electrode material having a weight-average mesopore/macropore specific surface area within a specific range is used, a pre-doping speed is adjusted so as to reduce and suppress the expansion of the electric storage device, which is caused by the generation of the decomposed gas from the component of the electrolyte solution.

The effect obtained by the representative aspect will briefly be described. Since an electrode material having a weight-average mesopore/macropore specific surface area within a specific range is used, the expansion of the electric storage device, which is caused by the generation of the decomposed gas from the component of the electrolyte solution, can be reduced and suppressed during the pre-doping operation. A means for suppressing gas-generation is to accelerate the pre-doping speed. Specifically, when the potential drop of all negative electrodes involved with the pre-dope is accelerated, all negative electrodes in the electrode unit can speedily reach the potential by which an SEI component made of lithium alkyl carbonate can be produced on the surface of the negative electrode. Consequently, the absolute amount of the gas produced by the decomposition of the electrolyte solution can be reduced. By virtue of this, the material having the weight-average mesopore/macropore specific surface area within the specific range, which cannot be used because of the expansion of the cell due to the generation of the decomposed gas from the electrolyte solution, can be safely used for the electric storage device as an electrode material. When the material having the weight-average mesopore/macropore specific surface area within the specific range is used for the electrode material, the input/output characteristic of the electric storage device can be improved.

BRIEF DESCRIPTION OF THE DRAWINGS

FIGS. 1A and 1B are explanatory views for explaining the number of the negative electrodes to one lithium electrode;

FIG. 8A is a perspective view illustrating the electric storage device, and FIG. 8B is a plan view illustrating the electric storage device;

FIG. 9 shows the combined air permeabilities of the cells in the Experimental Examples 1 to 15 and Comparative Examples 1 to 6;

FIG. 16 is a graph illustrating the discharging load characteristic and the charging load characteristic of each test cell at ambient temperature of 25° C.; and FIG. 17 is a graph showing a discharging DC resistance and a charging DC resistance at an ambient temperature of 25° C.

DETAILED DESCRIPTION OF THE PREFERRED EMBODIMENTS

Figure 2:
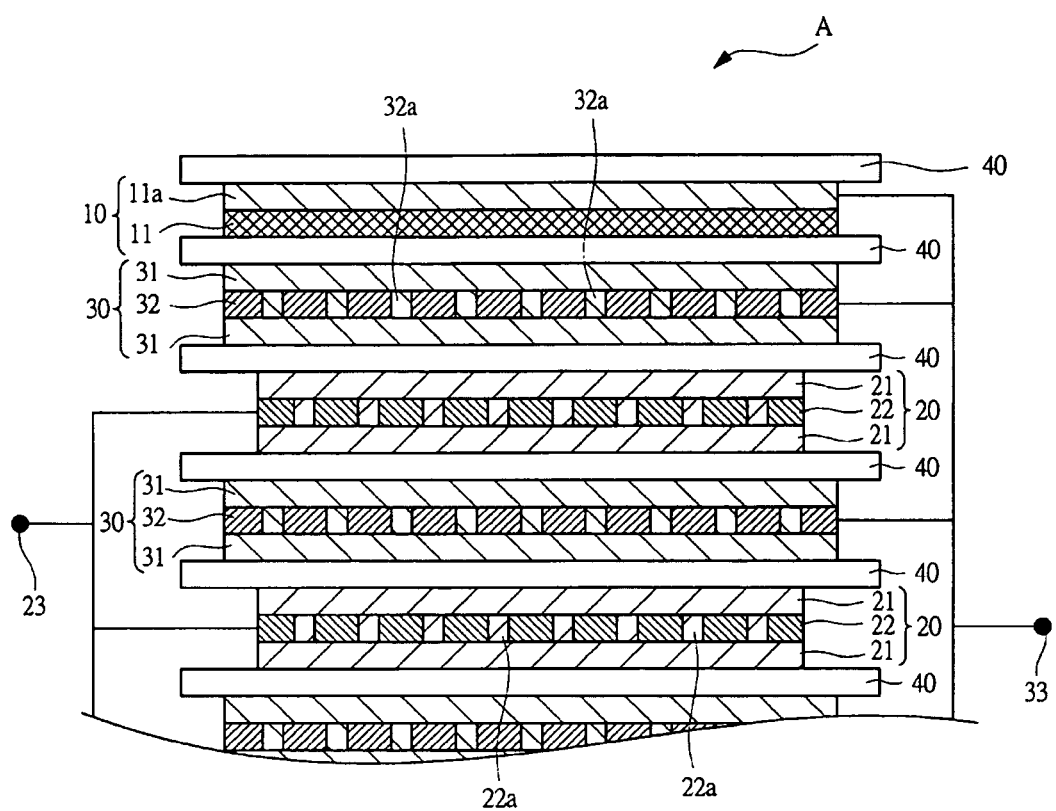
FIG. 2 is a diagram schematically illustrating an electrode structure when the electric storage device is configured as a lithium ion capacitor.

An embodiment of the present invention will be explained in detail below with reference to the drawings. The present invention is well adaptable to an electric storage device in which lithium ions are pre-doped. For example, the present invention can be used for an electric storage device in which lithium ions are pre-doped into a negative electrode. The present invention is especially effective when a material in which a weight-average mesopore/macropore specific surface area falls within a predetermined range is used for the negative electrode. The negative electrode described above is effective for a configuration in which the negative electrode forms a stacked structure together with a positive electrode, or for a configuration in which the negative electrode forms a wound structure, including a flat shape, together with a positive electrode. For example, it is well adaptable to a case in which the electric storage device has a stacked structure including a plurality of negative electrodes and a plurality of positive electrodes, wherein each of the negative electrodes and each of the positive electrodes are stacked so as to face each other. A separator is interposed between each of the negative electrodes and each of the positive electrodes. As described above, the present invention is well adaptable for a device in which plural structures of the negative electrode, separator, and the positive electrode in this order are stacked, or for a device in which electrode units, each of which are formed by stacking the plural structures of the negative electrode, the separator, and the positive electrode in this order, are stacked.

In the present invention, the pre-dope of the lithium ions means the process in which the lithium ions are doped into the positive electrode and the negative electrode from a third electrode, which is different from the opposite positive electrode and the negative electrode, before the charging operation is performed between the positive electrode and the negative electrode. When the lithium ions are pre-doped into the positive electrode and the negative electrode, or into the positive electrode or the negative electrode, the capacity loss of the electric storage device, which is caused by irreversible capacity of an electrode material, can be offset. Further, the average cell voltage of the electric storage device can be increased, and a material that does not originally has a lithium ion or a material that runs short of lithium ions can be used as the electrode material. That is, pre-dope of the lithium ions can overcome the drawbacks of the electrode material, and can utilize the fullest extent of advantages. Accordingly, the performance of the electric storage device can be enhanced.

In the present invention, the term doping (dope) involves storage, support, adsorb or insert, and specifically phenomenon where lithium ions and/or anions enter the positive electrode or the negative electrode. The term de-doping (de-dope) involves release, desorb and detach, and specifically a phenomenon reverse to the doping phenomenon described above. The pre-dope means the process in which ions such as lithium ions are doped preliminarily into a necessary electrode before the electric storage device is used.

The expressions such as mesopore and macropore are in accordance with the classification by International Union of Pure and Applied Chemistry (IUPAC). Specifically, a pore having a pore diameter of 2 nm or less is defined as a micropore, a pore having a pore diameter of more than 2 nm and 50 nm or less is defined as a mesopore, and a pore having a pore diameter of more than 50 nm is defined as a macropore. In the present invention, the mesopore/macropore specific surface area means the sum of the specific surface area of the mesopores each having a pore diameter within the range of 2 nm to 50 nm, and the specific surface area of the macropores each having the pore diameter within the range of 50 nm to 200 nm. The specific surface areas described above are determined by analyzing the nitrogen adsorption isotherm, which is obtained by a nitrogen adsorption method at 77 K with the use of an automatic specific surface area/pore distribution measuring apparatus BELSORP-minill manufactured by BEL Japan, Inc., at the adsorbed side in accordance with a BJH (Barrett-Joyner-Haleda) method. The BET specific surface area means the specific surface area obtained by analyzing the nitrogen adsorption isotherm with a BET multipoint method in the BET (Brunauer-Emmett-Teller) method.

The weight-average mesopore/macropore specific surface area in the present invention is defined as a ratio of a sum of "the product of the mesopore/macropore specific surface area of a carbon (hereinafter referred to as an active material carbon, if needed), which is a major material of the negative electrode active material, and the weight of the active material carbon in the negative electrode mixture member, and the product of the mesopore/macropore specific surface area of a carbon (hereinafter referred to as a non-active material carbon, if needed), such as a carbon black, added as a conductive material and the weight of the non-active material carbon, such as a carbon black, in the negative electrode mixture member" and "the sum of the weight of the active material carbon, which is the negative electrode active material, in the negative electrode mixture member and the weight of the non-active material carbon serving as the conductive material in the negative electrode mixture member". If the non-active material carbon is not present, the weight-average mesopore/macropore specific surface area is substantially equal to the mesopore/macropore specific surface area.

When the non-active material carbon is not present in the negative electrode mixture member, the mesopore/macropore specific surface area can be obtained by measuring the powders of the active material carbon with the use of the apparatus described above. When the non-active material carbon is contained in the negative electrode mixture member in addition to the active material carbon, the powders of the active material carbon in a predetermined amount and the powders of the non-active material carbon in a predetermined amount in the negative electrode mixture member are mixed, and the resultant is measured with the use of the apparatus described above so as to obtain the weight-average mesopore/macropore specific surface area. The weight-average mesopore/macropore specific surface area of the negative electrode incorporated in the electric storage device (hereinafter sometimes referred to as a cell) can be obtained as described below.

A discharging operation is performed to the cell so as to lower the cell voltage to the lower-limit voltage specified in the specification. Then, the cell is disassembled, and the negative electrode is taken out with careful attention not to cause the short-circuit between the positive electrode and the negative electrode. The negative electrode taken out is washed and rinsed several times with the use of solvent such as diethyl carbonate or dimethyl carbonate in order to remove electrolyte solution deposited onto the negative electrode. The above-mentioned solvent is air-dried, and then, the negative electrode is immersed into distilled water. Then, ultrasonic wave is further irradiated thereto, whereby the negative electrode mixture member is separated from the current collector. The current collector from which the negative electrode mixture member is separated is removed. Next, the distilled water containing the negative electrode mixture member is subject to suction filtration, and then, the negative electrode mixture member on a filter paper is sufficiently washed with water in order to remove the material, deposited onto the negative electrode and having low solubility, such as $Li_2CO_3$, LiF, etc. When the collected negative electrode mixture member is coarse-grained due to a binder or the like, the coarse grains of the negative electrode mixture member are comminuted through attrition. The powders of the negative electrode mixture member thus obtained is dried under reduced pressure at the temperature by which the negative electrode mixture component is not altered, i.e., at the temperature of 150° C. to 200° C., thereby removing water content. After being dried under reduced pressure, the resultant is measured by using the apparatus described above, whereby the weight-average mesopore/macropore specific surface area of the negative electrode mixture member incorporated into the cell can be obtained. A rough drying process may be performed before the reduced-pressure drying process, and the comminuting process of the coarse grains may be performed after the rough drying process. The order of the processes may suitably be changed in accordance with the workability and the condition of the obtained product.

In general, the binder such as styrene-butadiene rubber (SBR), a thickening or dispersing agent such as carboxymethyl cellulose (CMC), which are added to form the negative electrode mixture member, lose their weight by about 30 weight percent when they are heated at about 350° C. under an inert atmosphere. By utilizing this, the heat treatment at about 350° C. is performed to the powders of the negative electrode mixture member under the inert atmosphere after the reduced-pressure drying process, and the approximate composition ratio of the negative electrode material and the additive agent such as the binder contained in the negative electrode mixture member can be found from the decreased amount of the weight. When the composition ratio is used with respect to the weight-average mesopore/macropore specific surface area in the negative electrode mixture member, the weight-average mesopore/macropore specific surface area of the negative electrode material contained in the negative electrode mixture member can be obtained.

The method of measuring the mesopore/macropore specific surface area and the weight-average mesopore/macropore specific surface area of the negative electrode material are described above. However, when the numerical value falls within the weight-average mesopore/macropore specific surface area in the specific range specified in the present specification in case where the method is performed according to the method defined in the present specification, even if the preparation method of the specimen for the measurement or the measuring method is different from those in the present specification, the mesopore/macropore specific surface area or the weight-average mesopore/macroore specific surface area in the different case can be regarded as the mesopore/macropore specific surface area or the weight-average mesopore/macropore specific surface area specified in the present specification.

In the present invention, the weight-average mesopore/macropore specific surface area of the negative electrode material involved with the dope and de-dope of the lithium ions is defined as between 10 $m^2$/g and 85 $m^2$/g. More preferably, it is specified within the range between 10 $m^2$/g and 35 $m^2$/g. The negative electrode material includes a negative electrode active material, for example. Examples of the negative electrode active material include an alloy material such as tin and silicon, oxide such as silicon oxide, tin oxide and vanadium oxide, various carbon materials such as graphite, graphitizable carbon and hard carbon (non-graphitizable carbon, and polyacene-based material. The negative electrode active material described above may be used alone or plural negative electrode active materials may be mixed, in accordance with the purpose. The negative electrode material may be made of the negative electrode active material and the negative electrode mixture component involved with the dope and de-dope of the lithium ions and containing carbon material such as conductive material.

When the negative electrode material involved with the dope and the de-dope of the lithium ions is made of only the active material, the mesopore/macropore specific surface area of the active material may be between 10 m²/g and 85 m²/g. More preferably, it is specified within the range between 10 m²/g and 35 m²/g. When the non-active material carbon, such as the conductive material, involved with the dope and the de-dope of the lithium ions is contained in the negative electrode mixture member in addition to the active material carbon of the negative electrode, the weight-average mesopore/macropore specific surface area of the negative electrode active material and the carbon material such as the conductive material other than the negative electrode active material may be within the range between 10 m²/g and 85 m²/g. More preferably, it is specified within the range 10 m²/g and 35 m²/g. When the mesopore/macropore specific surface area of the negative electrode active material that allows the lithium ions to be doped or de-doped is out of the above-mentioned predetermined range, the other materials, such as the conductive material, which can allow the lithium ions to be doped or de-doped, may be mixed, whereby the weight-average mesopore/macropore specific surface area may fall within the predetermined range.

Two negative electrodes are supposed. One of them is the negative electrode in which 80 g of the active material carbon, which has the BET specific surface area of 7 m²/g and the mesopore/macropore specific surface area of 5 m²/g (the specific surface area of the mesopore region is 5 m²/g), and 20 g of the carbon black, which serves as the non-active material carbon and has the mesopore/macropore specific surface area of 80 m²/g, are contained in the negative electrode mixture member. The other one is the negative electrode in which 100 g of the active material carbon, which has the BET specific surface area of 28 m²/g and the mesopore/macropore specific surface area of 20 m²/g (the specific surface area of the mesopore region is 20 m²/g) is contained in the negative electrode mixture member. In this case, the weight-average mesopore/macropore specific surface area of the carbon that is involved with the dope and de-dope of the lithium ions and that is contained in the former negative electrode mixture member is 20 m²/g, while the weight-average mesopore/macropore specific surface area of the latter is 20 m²/g, according to the present invention. In the present invention, both of the weight-average mesopore/macropore specific surface areas are substantially the same. However, according to JP-A No. 2007-91557, the specific surface area of the mesopore region in the former one is 5 m²/g, while the specific surface area of the mesopore region in the latter is 20 m²/g. When the charging/discharging characteristics of both of them are compared, the input/output characteristic of the latter one is excellent as the electric storage device according to JP-A No. 2007-91557. However, they are not so different from each other in actuality. As described above, the weight-average mesopore/macropore specific surface area described in the present invention and the specific surface area of the mesopore region described in JP-A No. 2007-91557 are totally different.

In the present invention, the mesopore/macropore specific surface area or the weight-average mesopore/macropore specific surface area of the negative electrode material contained in the negative electrode mixture member is regarded as a quasiquantitative number of sites by which the lithium ions can go in and out the negative electrode active material. Specifically, the mesopore/macropore specific surface area is regarded as an approximate of the effective surface area involved with the go-in and go-out of the lithium ions with respect to the negative electrode. Different from JP-A 2007-91557, the present invention employs the mesopore/macropore specific surface area including the macropores each having the pore diameter of 200 nm or less. The relationship between the specific surface area of the pore diameter of 2 nm or more and the charging/discharging characteristic of the electric storage device is closely examined by using the negative electrodes, each having the pore diameter of 200 nm or less and the pore diameter distribution is different from one another. As a result of the examination, the correlation between the specific surface area and the charging/discharging characteristic becomes more satisfactory in the mesopore/macropore specific surface area in which the range of the pore diameter increases up to the macropore having the diameter of 200 nm than in the case of only the specific surface area of the mesopores.

As explained above, when the absolute value of the mesopore/macropore specific surface area or the absolute value of the weight-average mesopore/macropore specific surface area increases, it is considered that the lithium ions can go more smoothly into the negative electrode material or out of the negative electrode material. When the sites where the lithium ions can go into and out from the negative electrode material are increased, the lithium ions can more smoothly move, whereby the input/output characteristic can be enhanced. The negative electrode material according to the present invention aims to enhance the input/output characteristic by increasing the number of the ports that are open toward the electrolyte solution of the negative electrode material when the lithium ions are doped or de-doped. Further, when the negative electrode material is made of the active material and the carbon material other than the active material, such as carbon black, which can allow the lithium ions to be doped or de-doped, can be used as the conductive material, the weight-average mesopore/macropore specific surface area is used as the expression form of the mesopore/macropore specific surface area. This is a novel idea. It is to be noted that it is not only the conventional expression form of the mesopore/macropore specific surface area.

When the mesopore/macropore specific surface area or the weight-average mesopore/macropore specific surface area of the negative electrode material is less than 10 m²/g, the effect of reducing the DC resistance, which indicates the voltage drop immediately after the start of the charging/discharging, cannot sufficiently be achieved. Therefore, the charging/discharging capacity obtained upon a high-load charging/discharging is small. Specifically, a sufficient input/output characteristic cannot be achieved.

Accordingly, it is determined that the material described above is not necessarily regarded as the material belonging to the weight-average mesopore/macropore specific surface area in the specified range in the present invention. It is determined that at least 10 m²/g or more is needed in order that the effect of reducing the DC resistance due to the negative electrode material is regarded to be advantageous for enhancing the property of the electric storage device.

The mesopore/macropore specific surface area or the weight-average mesopore/macropore specific surface area is of course affected by which material is used as the negative electrode material. However, when the mesopore/macropore specific surface area or the weight-average mesopore/macropore specific surface area is 10 m²/g or more, the enhancement of the property of the electric storage device by the effect of reducing the DC resistance are remarkably felt, within the range of the negative electrode materials used and studied by the present inventors.

When the mesopore/macropore specific surface area or the weight-average mesopore/macropore specific surface exceeds 85 m²/g, the decomposed gas from the component of the electrolyte solution is generated during the pre-doping process of the lithium ions into the negative electrode, which causes the expansion of the electric storage device. Thus, this is not preferable. When the mesopore/macropore specific surface area or the weight-average mesopore/macropore specific surface area reaches 160 m$^2$/g, the expansion of the electric storage device cannot be suppressed even by a technique according to the present invention described later, so that the electric storage device cannot be used from the viewpoint of safety. More preferable upper limit of the mesopore/macropore specific surface area or the weight-average mesopore/macropore specific surface area is 35 m$^2$/g. When the mesopore/macropore specific surface area or the weight-average mesopore/macropore specific surface area exceeds 35 m$^2$/g, the initial irreversible capacity can be offset by the pre-doping process of the lithium ions, but the reduced DC resistance upon the charging contrarily increases. Thus, this is not preferable. Since the irreversible reaction with the electrolyte solution, which is continuously caused on the negative electrode, becomes remarkable, a problem might occur in which the lifetime characteristic such as cycle characteristic is deteriorated due to the unbalanced charging/discharging. Thus, this is not particularly preferable.

Accordingly, in the present invention, the upper limit of the mesopore/macropore specific surface area or the weight-average mesopore/macropore specific surface area is set to 85 m$^2$/g or less, more preferably to 35 m$^2$/g or less. When the mesopore/macropore specific surface area or the weight-average mesopore/macropore specific surface area is 35 m$^2$/g or less, the effect of enhancing the property of the electric storage device thanks to the effect of reducing the DC resistance can be felt.

Since the mesopore/macropore specific surface area or the weight-average mesopore/macropore specific surface area of the negative electrode material is specified within the specific range as described above, the effect of reducing the DC resistance can be increased, and consequently, high output, i.e., both of a high input/output characteristic and high energy density, when the electric storage device is charged or discharged, can be achieved. A remarkable effect can also be achieved in enhancing low-temperature characteristic.

In the negative electrode material having the weight-average mesopore/macropore specific surface area including the mesopore/macropore specific surface area specified in the specific range, it is preferable that an aspect ratio indicated by a ratio of a longer diameter and a shorter diameter of a grain is near 1 in the negative electrode material having anisotropy, such as graphite. This is because, when the aspect ratio becomes close to 1, the mesopore/macropore specific surface area or the weight-average mesopore/macropore specific surface area and the sites where the lithium ions go in and go out can more quantitatively be grasped. However, as for the inlet/outlet of the lithium ions, it is more preferable that there is no directivity in the inlet/outlet than the case in which there is directivity. It can be said that amorphous structure, such as amorphous carbon, is more preferable than crystalline structure.

However, when the negative electrode material in which the weight-average mesopore/macropore specific surface area falls within the specific range is used for the negative electrode, the electric storage device might extremely expand because of the generation of the decomposed gas from the component of the electrolyte solution during the pre-doping process of the lithium ions, as the case may be. When the electric storage device is expanded, the gap between the electrodes increases in the electric storage device, with the result that the resistance increases or liquid junction of the electrolyte solution is deteriorated. Accordingly, troubles occur during the pre-doping process of the lithium ions, thus not preferable. When the electric storage device is extremely expanded, the unfavorable condition might occur, such as the condition in which the electrolyte solution is leaked or the condition in which the gas is leaked.

When the negative electrode material having the weight-average mesopore/macropore specific surface area that is less than the lower limit of the specific range is used for the negative electrode, the electric storage device is not expanded to a significant degree in any cases.

The present invention aims to improve the expansion of the electric storage device during the pre-doping process of the lithium ions into the negative electrode, the expansion being caused when the negative electrode having the weight-average mesopore/macropore specific surface area within the specific range is used for the negative electrode.

The case in which the expansion of the electric storage device is observed in case where the electric storage device is a stacked-type electric storage device means the case in which the electrodes or separators used for producing the electric storage device are different, or the case in which the number of lithium electrode or electrode device provided in the electric storage device, or the number of stacked electrodes in an electrode unit, are different. The case in which the expansion of the electric storage device is observed in case where the electric storage device is a wound-type electric storage device means the case in which the electrodes or separators used for producing the electric storage device are different, or the case in which the number of lithium electrode or electrode device provided in the electric storage device, or the wound number of electrodes in a wound electrode unit, are different. In these cases, the extreme expansion of the electric storage device is observed due to the generation of the decomposed gas from the component of the electrolyte solution during the pre-doping process of the lithium ions into the negative electrode.

As a result of close examination, the case in which the electrodes and separators are different means the case in which the air permeability of the electrodes and separators is small. The case in which the number of lithium electrode formed in the electric storage device or the number of electrodes (the number of turn of the electrode) in the electrode unit is different means the case in which the number of the lithium electrodes is small, and the number of the electrodes (the number of turn of the electrode) in the electrode unit is large. The case in which the number of lithium electrode formed in the electric storage device or the number of electrodes (the number of turn of the electrode) in the electrode unit is different means the case in which, when the lithium electrode is provided so as to face the electrode unit in the electric storage device, the ratio of the number of the stacked electrodes (the number of turn of the electrode) in the electrode unit to one surface of the lithium electrode is large. In these cases, the extreme expansion of the electric storage device, which becomes a significant problem, is observed during the pro-doping process of the lithium ions into the negative electrode.

The air permeability of the electrode or separator indicates the aeration property of the electrode or separator, i.e., the mobility of the electrolyte solution and ions in the electrolyte solution passing through the electrode or separator. Specifically, the case in which the air permeability of the electrode or the separator is small (the number of seconds of the air permeability is great) can be regarded as the case in which the mobility of the electrolyte solution and ions in the electrolyte solution passing through the electrode or the separator are low. Therefore, from the association between the extreme expansion of the electric storage device during the pre-doping process of the lithium ions and the air permeability of the electrode or the separator, when the mobility of the lithium ions from the lithium electrode to all negative electrodes, to which the lithium ions are to be pre-doped, in the electric storage device is low, i.e., when the pre-doping speed of the lithium ions to the negative electrodes is slow, it can be presumed that the electric storage device is extremely expanded due to the generation of the decomposed gas from the component of the electrolyte solution.

On the other hand, the ratio of the number of the stacked electrodes (the number of turn of the electrode) in the electrode unit to one surface of the lithium electrode (one lithium electrode) facing the electrode unit in the electric storage device, particularly the ratio of the number of the negative electrodes (the number of turn of the negative electrode) in the electrode unit to one surface of the lithium electrode, indicate the maximum distance that the lithium ions move toward the inner direction of the electrode unit from one surface of the lithium electrode (one lithium electrode) facing the electrode unit, when the electrode unit is formed by stacking plural positive electrodes and plural negative electrodes, for example. As the ratio of the number of the negative electrodes to one lithium electrode increases, it can be understood that the average distance that the lithium ions have to move from one lithium electrode increases. Specifically, it can be considered that, when the ratio of the number of the negative electrodes to one lithium electrode increases, the pre-doping speed of the lithium ions to the negative electrode decreases. Accordingly, from the association between the extreme expansion of the electric storage device during the pre-doping process of the lithium ions and the ratio of the number of the negative electrodes in the electrode unit to one lithium electrode formed in the electric storage device, it can be presumed that the electric storage device is extremely expanded due to the generation of the decomposed gas from the component of the electrolyte solution, when the pre-doping speed of the lithium ions to the negative electrode is slow, like the case of the air permeability of the electrode and the separator described above.

From the above, in case where the negative electrode material having the weight-average mesopore/macropore specific surface area within the specific range is used for the negative electrode, the cause of generating the decomposed gas from the component of the electrolyte solution to such a degree of allowing the electric storage device to extremely expand to a significant level during the pre-doping process of the lithium ions is involved with the pre-doping speed of the lithium ions into the negative electrode. It has been found that, when the pre-doping speed of the lithium ions is slow, the electric storage device is extremely expanded.

In order to verify in detail the casual relationship between the pre-doping speed of the lithium ions and the expansion of the electric storage device based upon the consideration above, the behavior of the potential change of the negative electrode and the change in the appearance of the cell during the pre-doping process of the lithium ions are examined for each of the stacked-type cell structures. When the lithium ions are pre-doped into the negative electrode, the potential of the negative electrode lowers. At the point when the lithium ions are completely pre-doped, the potentials of all negative electrodes, to which the lithium ions are pre-doped, have to be dropped to the same potential. Further, even if the potential drop of each of the negative electrodes in the electrode unit is measured, the potential difference is supposed not to be produced, as a rule. However, the present inventors have considered that, when the pre-doping process is not completed, i.e., during the pre-doping process, the rate of the potential drop of each of the negative electrodes in the electrode unit is different from one another. The present inventors have considered that the lithium ions are easy to be pre-doped into the negative electrode that is closer to the lithium electrode, so that the rate of the potential drop of the negative electrode that is closer to the lithium electrode is great during the same time. The present inventors have also considered that, on the other contrary, the lithium ions are difficult to be pre-doped into the negative electrode that is positioned apart from the lithium electrode, so that the rate of the potential drop of the negative electrode that is positioned apart from the lithium electrode is small during the same time. Specifically, the present inventors have presumed that the pre-doping speed of the lithium ions to the negative electrode, which is positioned apart from the lithium electrode, is slow, since it takes much time for the lithium ions from the lithium electrode to reach there. Based upon this viewpoint, the present inventors focus on the relationship between the lithium electrode and the negative electrodes to which the lithium ions are pre-doped, and performs a test relating to the potential change, while regarding the degree of the drop of the negative electrode potential during the pre-doping process as the pre-doping speed. The expansion of the electric storage device caused by the generation of the decomposed gas from the component of the electrolyte solution is determined as described below. Specifically, the pre-doping process is performed with the electric storage device sealed by an outer casing, and the expansion of the electric storage device is determined by the degree of the expansion of the outer casing.

In the stacked structure in which the negative electrodes and the positive electrodes are alternately stacked, the lithium electrode for pre-doping the lithium ions is arranged at the outermost part of the stacked unit from the viewpoint of working efficiency. The consideration described above has to be presumed in the structure in which one lithium electrode is arranged at the outermost part of the stacked unit including the negative electrodes and the positive electrodes. However, the potential change during the pre-doping process has never been checked in detail. It has actually been found from the measurement that the potential of the negative electrode, which is positioned close to the lithium electrode, is low at each time, and the potential of the negative electrode, which is positioned apart from the lithium electrode (hereinafter sometimes referred to as the remotest position), is high at each time, as is considered. It has been found that there is a conspicuous difference in the potential drop at the remotest position in the structure in which the air permeability of the electrode and the separator is small, and the structure in which the ratio of the number of the negative electrodes in the electrode unit to one lithium electrode facing the electrode unit in the electric storage device is great, i.e., the structure in which the pre-doping speed of the lithium ions is supposed to be slow. Further, it has been found that, even if the air permeability of the electrode and the separator is different, or even if the ratio of the number of the negative electrodes in the electrode unit to the lithium electrode facing the electrode unit is different, there is no significant difference in the potential drop of the negative electrode positioned close to the lithium electrode.

It can also be confirmed that the electric storage device is extremely expanded during the pre-doping process of the lithium ions in the structure in which the potential of the negative electrode positioned at the remotest position from the lithium electrode is higher at each time, i.e., in the structure in which the pre-doping speed of the lithium ions is supposed to be slow, as is expected.

The behavior of the expansion of the electric storage device is examined in detail in accordance with the lapse of time during the pre-doping process of the lithium ions. As a result of the examination, it has been found that the electric storage device is not opened but tends to contract from a certain point due to the expansion thereof, i.e., that there is the maximum value in the expansion of the electric storage device. As for the behavior of the expansion of the electric storage device depending upon the difference in the structure, it has been found that the time taken to confirm the expansion of the electric storage device is short, and the time taken to reach the maximum value is short, such as within 24 hours from the start of the pre-doping process of the lithium ions, although the maximum value itself is small, in the structure in which the rate of the potential drop of the negative electrode, which is located at the remotest position from the lithium electrode, is great, i.e., in the structure in which the pre-doping speed of the lithium ions is supposed to be fast. It has also been found that, in the structure in which the pre-doping speed of the lithium ions is supposed to be fast, not only the rate of change in the expansion of the electric storage device is great during the pre-doping process of the lithium ions, but also the rate of change in the contraction afterward of the electric storage device is great.

It has also been found that, contrary to the structure in which the pre-doping speed of the lithium ions is supposed to be fast, the structure in which the pre-doping speed of the lithium ions is supposed to be slow takes much time to confirm the expansion of the electric storage device and takes much time to reach the maximum value. Further, it has been found that the maximum value itself is great.

From the above, it has been found that, when the negative electrode having the weight-average mesopore/macropore specific surface area within the specific range is used for the negative electrode, the electric storage device is extremely expanded during the pre-doping process of the lithium ions in the cell structure in which the pre-dope of the lithium ions is limited as the whole electric storage device because of the factor that the air permeability of the electrode and the separator is small or that the ratio of the number of the negative electrodes in the electrode unit to one lithium electrode facing the electrode unit in the electric storage device is great.

The gas generated in the expanded electric storage device is taken, and the resultant is subject to the qualitative and quantitative analysis with the use of a gas chromatographic mass spectrometer (GC-MS) or a gas chromatography (GC). As a result, it is confirmed that the gas having propylene as a main component is produced from the electric storage device, when the electrolyte solution contains propylene carbonate, the gas having ethylene as a main component is produced, when the electrolyte solution contains ethylene carbonate, the gas having hydrogen, carbon monoxide, and carbon dioxide as a main component is produced, when the electrolyte solution contains diethyl carbonate. From the above, it is expected that the decomposed gas from the component of the electrolyte solution generated from the electric storage device during the pre-doping process is mainly the reductive decomposition gas of the solvent in the electrolyte solution.

Based upon the consideration described above, the examination is made for the reductive decomposition of the aprotic polar solvent in the electrolyte solution, in particular, the reductive decomposition of the propylene carbonate (PC) and the ethylene carbonate (EC).

It has firstly been found that the potential of the negative electrode lowers since the lithium ions are doped into the negative electrode, and that, when the potential of the negative electrode reaches 1.5 V (vs. Li/Li+) or less, the PC and EC are reduced on the negative electrode to cause the reaction producing propylene or ethylene and lithium carbonate ($Li_2CO_3$). As described above, the propylene and ethylene are in the form of gas at room temperature, so that they expand the electric storage device. On the other hand, the $Li_2CO_3$ generated with the propylene or ethylene is deposited onto the surface of the negative electrode. This reaction is likely to occur more actively, as the mesopore/macropore specific surface area or the weight-average mesopore/macropore specific surface area of the negative electrode material increases. When the potential of the negative electrode further lowers, specifically, when the potential of the negative electrode lowers to 0.9 V or less (vs. Li/Li+) in the case of the PC, and the potential of the negative electrode lowers to 1.0 V or less (vs. Li/Li+) in the case of the EC, the amount of the decomposition reaction of the PC and EC increases, so that the concentration of the intermediate product caused by the reduction of the PC and EC increases. Therefore, it has been found that the reaction of producing a compound, which is collectively referred to as lithium alkyl carbonate, and propylene or ethylene, or the reaction of producing only lithium alkyl carbonate, is caused in addition to the reaction described above. Like $Li_2CO_3$, the lithium alkyl carbonate is deposited onto the surface of the negative electrode. It is considered that the plural reactions described above are competitively caused at the potential regions where the respective reactions can be caused.

The following formulas represent the reaction described above, when the PC is taken as an example. The compound collectively referred to as lithium alkyl carbonate can be referred to as SEI (Solid Electrolyte Interphase) or passivation film, in general.

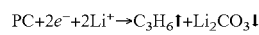

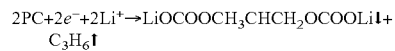

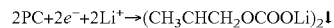

It has also been found that the propylene or ethylene produced by the reductive decomposition of the PC and EC is decomposed and polymerized on the negative electrode. The reductive decomposition gas of the electrolyte solution confirmed in the present invention is produced, and at the same time, consumed. Specifically, when the electric storage device is expanded, it can be presumed that the amount of the produced reductive decomposition gas exceeds the consumed amount. On the other hand, when the expansion of the electric storage device is stopped, and the expanded electric storage device is contracted, it can be considered that the consumed amount of the reductive decomposition gas exceeds the produced amount. It can be grasped that the momentum of expanding or contracting the electric storage device indicates the magnitude of the deviation between the produced amount and the consumed amount of the reductive decomposition gas.

The phenomenon in which the expanded electric storage device is contracted from a certain point is considered to be caused by this condition. It has been described above that the rate of change in the expansion of the electric storage device during the pre-doping process of the lithium ions is great in the structure in which the pre-doping speed of the lithium ions is supposed to be fast. It can be considered that, since the pre-doping speed of the lithium ions is increased, the reaction of producing SEI is caused intensively in a short period, and the reductive decomposition gas sub-generated in the reaction is also produced intensively.

It has not yet been clear why the expansion of the electric storage device during the pre-doping process of the lithium ions is small in the structure in which the pre-doping speed of the lithium ions is supposed to be fast. However, the present inventors have presumed as described below from the finding described above.

When the pre-doping speed of the lithium ions is increased, the potentials of all negative electrodes provided in the electric storage device can quickly be lowered to the potential by which the competitive reaction can be caused at the initial stage of the pre-doping process. As a result, when the PC or EC is used for the component of the electrolyte solution, the SEI component made of lithium alkyl carbonate can be formed on the surface of the negative electrode in a shorter period during the pre-doping process of the lithium ions. In the reaction of producing the lithium alkyl carbonate, the presence of the reaction that does not sub-generate the reductive decomposition gas of the electrolyte solution is indicated. Therefore, when the potentials of all negative electrodes provided in the electric storage device are quickly lowered to the potential by which the competitive reaction can be caused, the absolute amount of the gas produced by the decomposition of the electrolyte solution can be reduced. Accordingly, the expansion of the electric storage device is expected to be reduced. The molecular size of the lithium alkyl carbonate is considered to be greater than the molecular size of $Li_2CO_3$, those of which are considered to have the function as SEI. Therefore, it is considered that a denser SEI layer can be formed on the surface of the negative electrode by forming more SEI components made of lithium alkyl carbonate on the surface of the negative electrode. By virtue of this, the continuous decomposition reaction of the electrolyte solution can be suppressed. Therefore, the absolute amount of the sub-generated gas from the decomposition of the electrolyte solution can be reduced, with the result that the expansion of the electric storage device is expected to be reduced.

The theory described above will be developed. It can be concluded that, when the negative electrode material having the weight-average mesopore/macropore specific surface area within the specific range is used for the negative electrode, the gas generated in the electric storage device during the pre-doping process, in some cases, is generated based on the negative electrode of the plural negative electrodes in the electrode unit, which negative electrode is supposed to have the slow pre-doping speed. For example, the negative electrode described above is the one located at the remotest position from the lithium electrode. The point is, when the pre-doping speed is supposed to be fast in the structure including stacked plural positive electrodes and plural negative electrodes and the lithium electrode arranged at the outermost part of the stacked unit, the total produced amount of the sub-generated gas caused by the decomposition reaction of the component of the electrolyte solution can be suppressed. The present invention can reduce and suppress the expansion of the electric storage device based upon the decomposition of the component of the electrolyte solution.

According to the finding described above, the production timing of the reductive decomposition gas, which is a by-product, can be adjusted by increasing the pre-doping speed of the lithium ions. Specifically, the production timing can be concentrated within about 24 hours from the start of the pre-doping process of the lithium ions. By utilizing this, there is proposed a technique of providing a predetermined keeping period by starting the pre-dope of the lithium ions before the electric storage device is sealed, after the injection of the electrolyte solution into the electric storage device, in addition to the technique of increasing the pre-doping speed of the lithium ions. Accordingly, the decomposition gas from the component of the electrolyte solution, which is produced at an early stage from the start of the pre-dope of the lithium ions, can be emitted to the outside of the electric device before the electric storage device is sealed, whereby the expansion of the electric storage device during the pre-doping process of the lithium ions can further be reduced and suppressed.

The present invention is accomplished on the basis of the way described above. According to the present invention, the pre-doping speed is increased, whereby the amount of the gas produced by the decomposition of the component of the electrolyte solution can effectively be reduced and suppressed. Consequently, the expansion of the electric storage device can be reduced and suppressed. Since the pre-doping process is started before the electric storage device is sealed, and the keeping period is provided, the expansion of the electric storage device during the pre-doping process of the lithium ions can more be reduced and suppressed. In this way, the present invention proposes, for the first time, the technique of suppressing the expansion of the electric storage device caused by the generation of the decomposed gas of the component of the electrolyte solution during the pre-doping process of the lithium ions.

There are various methods to increase the pre-doping speed. For example, there is a method in which the number of the negative electrodes provided in the electrode unit is reduced to decrease the ratio of the number of the negative electrodes in the electrode unit to one lithium electrode facing the electrode unit. Further, there is a method in which the air permeability of the electrode and the separator used for the electrode unit is increased.

In the former method, the number of the negative electrodes and the number of the positive electrodes, which form a stacked structure, are reduced, in case where the electrode unit is the stacked type. Since the number of the stacked negative electrodes (the number of the layers of the negative electrodes) in the electrode unit is decreased, the distance between the lithium electrode and the negative electrode that is most apart from the lithium electrode can be shortened. Since the distance is shortened, the lithium ions can be doped speedily into the negative electrode that is most apart from the lithium electrode. Since the pre-doping speed is increased, the potential drop of the negative electrode involved with the pre-dope is accelerated, so that the negative electrode can speedily reach the potential by which the lithium alkyl carbonate can be produced. Accordingly, the expansion of the electric storage device due to the generation of the decomposed gas from the component of the electrolyte solution can be reduced and suppressed. This fact can be achieved by reducing the number of the stacked electrodes of the stacked unit or reducing the number of turn of the wound electrodes of the wound unit.

The structure described above can be taken in order to clarify the relationship between the metal lithium of the lithium electrode and the negative electrode in the electrode unit, which faces the metal lithium of the lithium electrode, to be more correct. Specifically, the structure in which the ratio of the number of the negative electrodes to one lithium electrode facing the electrode unit is set to be a constant value or less may be taken. The structure described above can be expressed by the number of the stacked negative electrodes to one lithium electrode.

In the latter technique of increasing the pre-doping speed, increasing the air permeability of the electrode can be achieved by increasing the air permeability of a perforated current collector, or by controlling the porous structure of the positive electrode mixture member and the negative electrode mixture member. The pre-doping speed of the lithium ions can be increased by increasing the air permeability of the electrode. Specifically, the passing speed of the lithium ions passing through the current collector, the positive electrode mixture member, and the negative electrode mixture member is increased. The increase in the air permeability of the separator can be achieved by changing the separator used. The pre-doping speed of the lithium ions can be increased by increasing the air permeability of the separator. The changing point of the separator for increasing the air permeability is a porosity or thickness.

Since the air permeability of the electrode and the separator is increased, i.e., the air permeability of the components of the electrode unit including the positive electrode, negative electrode, and separator is increased, the lithium ions can easily pass through the components of the electrode unit. Since the lithium ions are easy to pass through the components of the electrode unit, the pre-doping speed is increased. When the pre-doping speed is increased, the potential drop, caused by the pre-dope of the lithium ions, of the negative electrode, which is located at the remotest position, can speedily be achieved. When the potential drop of the negative electrode caused by the pre-dope is accelerated, all negative electrodes in the electrode unit can speedily reach the potential by which the lithium alkyl carbonate can be produced. As a result, the expansion of the electric storage device due to the generation of the decomposed gas from the component of the electrolyte solution can be reduced and suppressed.

The air permeability is defined as a time (second) taken for the air in an amount of 100 mL to pass through a sheet of 642 $mm^2$. The air permeability is great as the time taken for the air in an amount of 100 mL to pass through the sheet of 642 $mm^2$ is short, i.e., as the absolute value of the number of seconds is small. The air permeability is measured on the basis of JIS P8117, 8111, ISO5636/5. The air permeability is measured by using, for example, Gurley type densometer G-B2C or G-B2 manufactured by Toyo Seiki Seisakusho, Ltd. The measurement is conducted at temperature of 23° C.±1° C. and relative humidity of 50 percent±2 percent. A sample is formed by cutting an electrode having a mixture layer containing an active material formed onto a perforated current collector having a predetermined open-area percentage. The sample is cut out in a size of 40×40 $mm^2$. As for the electrode and the separator incorporated into the cell, the sample for measuring the air permeability can be prepared as described below.

A discharging operation is performed to the cell so as to lower the cell voltage to the lower-limit voltage specified in the specification. Then, the cell is disassembled, and the positive electrode, the negative electrode, and the separator are sorted. Each of the components of the cell is washed and rinsed several times with the use of diethyl carbonate or dimethyl carbonate in order to remove electrolyte solution deposited onto the negative electrode. The above-mentioned solvent is air-dried, and then, the positive electrode and the separator are washed and rinsed with the solvent changed to distilled water. The solvent displacement is performed to the positive electrode and the separator, which are washed with water, with the use of a low-boiling solvent such as ethanol, and then, the resultant is dried under reduced pressure at a low temperature of about 60° C., by which the positive electrode and the separator is not altered, so as to remove the solvent. Thus, the sample of the positive electrode and the separator for measuring the air permeability can be prepared. When the positive electrode active material exhibits solubility to water, such as vanadium oxide, the protic polar solvent having low solubility can be selected, instead of distilled water, as the solvent used for washing.

On the other hand, the negative electrode is not washed with distilled water, but washed with ethanol instead of distilled water. Thereafter, the negative electrode is dried under reduced pressure at a low temperature of about 60° C. so as to remove the solvent, like the positive electrode and the separator. Thus, the sample of the negative electrode for measuring the air permeability can be prepared.

The method of preparing the samples for the measurement has been described above. Even if the method of preparing the sample for measuring the air permeability, the method of measuring the air permeability, or the manner of defining the air permeability are different from those defined in the present specification, the air permeability in the different case falling within the numerical range described in the present specification when it is converted into the air permeability defined in the present specification may be regarded as the air permeability defined in the present specification.

In order to collect the air permeability of the components of the electrode unit, the sum of the average air permeability of one positive electrode, the average air permeability of one negative electrode, and the average air permeability of one separator is defined as a combined air permeability. In the electrode stacked unit, the air permeabilities of all of the plural positive electrodes, negative electrodes, or separators in the electrode stacked unit are measured, or the air permeabilities of the plural positive electrodes, negative electrodes, or separators, whose air permeabilities can be measured, are measured. The average of these values is specified as the average air permeability of each component (positive electrode, negative electrode, separator) of the electrode unit. In the electrode wound type, the air permeability of one positive electrode, negative electrode and separator is measured at each position in the longitudinal direction, and the average of these values is specified as the average air permeability of each component (positive electrode, negative electrode, separator) in the electrode unit.

The above described plural techniques of increasing the pre-doping speed can be combined. By combining these techniques, the pre-doping speed can more be increased, whereby the expansion of the electric storage device caused by the generation of gas can more effectively be reduced and suppressed.

For example, when the technique of reducing the ratio of the number of the negative electrodes to one lithium electrode facing the electrode unit and the technique of increasing the combined air permeability made of the sum of the average air permeabilities of the used electrode and the separator (reducing the absolute value of the number of seconds) are combined, the pre-doping speed can more be increased than the case using only either one of the techniques. When there is a limitation, in the specification of the electric storage device, on either one of the structure of the electrode unit and the combined air permeability made of the air permeabilities of the used electrode and separator, one of the structure of the electrode unit and the combined air permeability, which is not limited or which is not strictly limited, is changed so as to increase the pre-doping speed of the lithium ions, while keeping the other one of the structure of the electrode unit or the combined air permeability, which is limited, within the limited range. Consequently, the expansion of the electric storage device caused by the generation of gas can more effectively be reduced and suppressed. The other techniques can be utilized in the present invention, so long as they can increase the pre-doping speed.

The present inventors have considered such that the above-mentioned plural techniques of increasing the pre-doping speed can be performed rapidly and simply by expressing the effectiveness based upon the techniques in the numerical value. In case where the negative electrode material having the weight-average mesopore/macropore specific surface area within the specific range is used for the negative electrode, the embodiment capable of reducing and suppressing the expansion of the electric storage device caused by the generation of the reductive decomposition gas from the electrolyte solution, is indicated by a numerical index. The numerical index X described above is represented by the equation (1) described below.

$$X = (\text{number of negative electrodes to one lithium electrode}) \times \log(\text{combined air permeability}) \quad (1)$$

For example, the numerical index X is a value in the form of a parameter represented by (number of negative electrodes to one lithium electrode facing the electrode unit)×log (combined air permeability) described in the equation (1). The number of the negative electrodes to one lithium electrode facing the electrode unit means the number of the negative electrodes per the opposite surface of the lithium electrode facing the electrode unit. Specifically, it means the number of the negative electrodes to which the lithium ions, which are emitted from the opposite surface of the lithium electrode, are pre-doped. Supposing that one lithium electrode faces the electrode unit. When the electrode unit has the electrode stacked structure, it means the number of the negative electrodes in the electrode unit. When the electrode unit has the electrode wound structure, and the electrode unit includes one positive electrode and one negative electrode, it means the number of turn of the wound electrode in the electrode unit.

FIGS. 1A and 1B are explanatory views for explaining the number of the negative electrodes to one lithium electrode. A stacked-type electrode unit U illustrated in FIG. 1A includes one positive electrode 20 and two negative electrodes 30. A lithium electrode 10 is arranged at the outer side of the electrode unit U so as to face one surface of the electrode unit U. In this case, two negative electrodes 30 are pre-doped with the lithium ions emitted from an opposite surface 10a of the lithium electrode 10. Accordingly, the number of the negative electrodes per the opposite surface of the lithium electrode, i.e., the number of the negative electrodes to one lithium electrode, is "2". A stacked-type electrode unit U illustrated in FIG. 1B has lithium electrodes 10 arranged at both sides of the electrode unit U so as to face both surfaces of the electrode unit U. In this case, one negative electrode 30 is pre-doped with the lithium ions emitted from an opposite surface 10a of the lithium electrode 10. Accordingly, the number of the negative electrodes per the opposite surface of the lithium electrode, i.e., the number of the negative electrode layers to one lithium electrode, is "1".

The numerical index X in the equation (1) is specified by using log (combined air permeability). The log (combined air permeability) means a logarithm to the bottom (10) of the combined air permeability (second/100 mL), i.e., a common logarithm.

The value is preferably 50 or less. When the numerical index X exceeds 50, the pre-doping speed of the lithium ions is decreased, which is not preferable. When the numerical index X exceeds 50, the expansion of the electric storage device is remarkable during the pre-doping process of the lithium ions in case where the negative electrode material having the weight-average mesopore/macropore specific surface area within the specific range is used for the negative electrode. Thus, this is not preferable.

Since the numerical value X is set to be 50 or less, the pre-doping speed of the lithium ions can be increased. When the numerical index X is set to be 50 or less, the expansion of the electric storage device can be reduced and suppressed during the pre-doping process of the lithium ions in case where the negative electrode material having the weight-average mesopore/macropore specific surface area within the specific range is used for the negative electrode.

The numerical index X is preferably between 5 and 40. When the numerical index X is set to be 40 or less, the pre-doping speed of the lithium ions can more be increased. When the numerical index X is set to 40 or less, the expansion of the electric storage device, which is caused by the generation of the decomposed gas from the component of the electrolyte solution, can be reduced and suppressed during the pre-doping process of the lithium ions in case where the negative electrode material having the weight-average mesopore/macropore specific surface area within the specific range is used for the negative electrode.

When the numerical index X is set to be 40 or less, and further, the pre-doping process of the lithium ions is started with the outer casing of the electric storage device opened after the impregnation into the electrolyte solution for providing the keeping period before the electric storage device is sealed, the expansion of the electric storage device, which is caused by the generation of the decomposed gas from the component of the electrolyte solution, can be reduced and suppressed during the pre-doping process of the lithium ions in case where the negative electrode material having the weight-average mesopore/macropore specific surface area within the specific range is used for the negative electrode. During the keeping period, the keeping atmosphere is preferably under reduced pressure (under negative pressure). The keeping period is 2 hours or more from the start of the pre-doping process of the lithium ions, more preferably 4 hours or more. When the keeping period is less than 2 hours from the start of the pre-doping of the lithium ions, the generation of the decomposed gas from the electrolyte solution during the pre-doping process of the lithium ions cannot be suppressed so much. Therefore, the effect of suppressing the expansion of the electric storage device is low, thus non-preferable. It is preferable that the upper limit of the keeping period is within 24 hours from the start of the pre-doping process of the lithium ions from the viewpoint of the manufacture of the cell and the timing of generating the gas. Accordingly, more preferable keeping period is between 4 hours and 24 hours from the start of the pre-dope of the lithium ions.

When the numerical index X is less than 5, it is supposed that either one or both of the term of the ratio of the number of the negative electrodes to one lithium electrode facing the electrode unit in the numerical index X and the log term (combined air permeability) in the numerical index X is extremely small. When the term of the ratio of the number of the negative electrodes to one lithium electrode facing the electrode unit in the numerical index X is less than 3, the number of the negative electrodes in one electrode unit is considered to be small, which is unsatisfactory from the viewpoint of productivity, cost, and energy density. When the log (combined air permeability) term in the numerical index X is 2.3 or less, it is considered that the electrode density of the positive electrode or the negative electrode is small, or that the strength of the separator is low, which is unsatisfactory from the viewpoint of energy density and safety.

Embodiment 1

In the present embodiment, it is described an electric storage device employing the above-mentioned structure in which the negative electrode material having the weight-average mesopore/macropore specific surface area within the specific range is used. The electric storage device can be configured as a lithium ion capacitor, for example. The electric storage device can also be configured as a lithium ion secondary battery.

FIG. 2 schematically illustrates an electrode structure when the electric storage device is configured as a lithium ion capacitor. As illustrated in FIG. 2, for example, the electric storage device is configured as a stacked-type lithium ion capacitor A. The lithium ion capacitor A includes a lithium electrode 10, positive electrodes 20, and negative electrodes 30. A plurality of positive electrodes 20 and negative electrodes 30 are alternately stacked in a state that a separator 40 is interposed between each of the positive electrodes 20 and each of the negative electrodes 30. The negative electrode 30 is arranged at the outermost part of the stacked structure. The lithium electrode 10 serving as an ion source is provided so as to face the negative electrode 30 arranged at the outermost part of the stacked structure through the separator 40. Thus, the stacked unit is formed. Although not illustrated, the stacked unit described above is soaked in electrolyte solution.

As illustrated in FIG. 2, the lithium electrode 10 has, for example, a metal lithium 11 mounted on a current collector 11a with a predetermined thickness. Each of the positive electrodes 20 has a positive electrode mixture member 21 formed on both surfaces of a current collector 22 with a predetermined thickness. Each of the negative electrodes 30 also has a negative electrode mixture member 31 formed on both surfaces of a current collector 32 with a predetermined thickness. The current collectors 22 and 32 are porous members having holes passing from the front to the reverse side thereof as illustrated in FIG. 2. Specifically, the current collectors 22 and 32 are provided with a great number of through-holes 22a and 32a.

A positive electrode terminal 23 is provided at each of the positive electrodes 20 so as to extend from the current collector 22. A negative electrode terminal 33 is provided at each of the negative electrodes 30 so as to extend from the current collector 32. When the lithium ion capacitor A is used, the positive electrode terminal 23 and the negative electrode terminal 33 are used. Thus, the lithium ion capacitor A, which is a stacked-type unit including the positive electrodes 20 and the negative electrodes 30, is formed. The term positive electrode means an electrode from which current flows out when the lithium ion capacitor is discharged, and the term negative electrode means an electrode to which current flows in when the lithium ion capacitor is discharged.

The lithium ion capacitor A thus configured is put into a package, which is an outer casing made of a laminate film, for example, whereby it becomes a product. Before being made as a product, the lithium ion capacitor A is pre-doped with lithium ions. Specifically, the lithium ion capacitor is pre-doped during the assembling process thereof with the outer casing being sealed. The pre-doping is executed between the lithium electrode 10 and the negative electrodes 30. The lithium ion capacitor is shipped as a product with the lithium ions doped in advance into the negative electrodes 30.

It is preferable to dope the negative electrode with lithium ions so that after the positive electrode and the negative electrode are short-circuited, the potential of the positive electrode is 2 V (vs. Li/Li+) or lower, for example. With this, the utilized capacity of the positive electrode increases to thereby enhance the energy density. The wording that the potential of the positive electrode after short-circuiting between the positive electrode and the negative electrode is 2 V (vs. Li/Li+) or lower means that the potential of the positive electrode, which is obtained by, for example, either of the following methods, is 2 V (vs. Li/Li+) or lower. The first method is as follows. After the doping of lithium ions, the positive electrode terminal and the negative electrode terminal of a cell of the lithium ion capacitor are directly connected by a conductor to be short-circuited. This short-circuiting state is left to stand for 12 hours or longer. Thereafter, the short-circuiting state is canceled and the potential of the positive electrode measured within a time range from 0.5 to 1.5 hours from the cancellation is 2 V (vs. Li/Li+) or lower.

The second method is as follows. By using a charging/discharging apparatus, the capacitor is discharged to 0 V at a constant current for 12 hours or longer after the completion of the pre-dope. Then, the positive electrode terminal and the negative electrode terminal are coupled together by means of a conductor to be short-circuited. In this state, the capacitor is left to stand for 12 hours or longer and the short-circuiting of those electrodes is canceled. The potential of the positive electrode measured within a time range from 0.5 to 1.5 hours from the cancellation is 2 V (vs. Li/Li+) or lower.

Generally, the upper limit of the charging voltage is determined by such a voltage as not to cause the decomposition of the electrolyte solution owing to the increase of the positive electrode potential. When the positive electrode potential is set at the upper limit, the charging voltage can be increased by the decrease of the negative electrode potential. If the potential of the positive electrode after short-circuiting is lowered to be 3 V (vs. Li/Li+) or lower, preferably 2 V (vs. Li/Li+) or lower, the utilized capacity of the positive electrode increases by the potential decrease and the capacity of the capacitor becomes high.

In a so-called hybrid capacitor, activated carbon is used for a positive electrode and carbon material such as graphite or non-graphitizable carbon, which is used in a lithium ion secondary battery, is used for a negative electrode. In such a hybrid capacitor, the activated carbon or the carbon material has usually a potential of 3 V (vs. Li/Li+) or thereabound. Therefore, even if the terminals of the positive electrode and the negative electrode are short-circuited, the potential of the positive electrode remains around 3 V (vs. Li/Li+). On the basis of those facts, in the lithium ion capacitor according to the present invention, the potential of the positive electrode is lowered to 3 V (vs. Li/Li+) or lower when the electrodes are short-circuited by doping the negative electrode with lithium ions, which are supplied from an ion source, e.g., metal lithium, which is separately provided.

One or both of the negative electrode and the positive electrode may be doped with the lithium ions. In this case, when the potential of the positive electrode is excessively lowered by increasing the doping amount of lithium ions, problems sometimes arise. For example, the lithium ions are irreversibly consumed and the cell capacity lowers. Accordingly, it is necessary to control the doping amounts of lithium ions at the negative electrode and the positive electrode so as not to cause such a problem. The controlling of the doping amounts of the lithium ions at the electrodes makes the cell forming process complicated. To avoid this, the lithium ions are preferably doped only into the negative electrode, which is executed in the lithium ion capacitor according to the present invention.

In the lithium ion capacitor A thus configured, the negative electrode material in the above description is used for the negative electrode 30. Specifically, the negative electrode active material described in the embodiment is contained in the negative electrode mixture member 31 formed on the current collector 32 for the negative electrode. The negative electrode mixture member 31 contains a non-graphitizable carbon material serving as an active material, and carbon black serving as a conductive material. The negative electrode material containing the active material and the conductive material has the weight-average mesopore/macropore specific surface area within the range of 10 m²/g or more and 85 m²/g or less.

When the negative electrode mixture member 31 does not contain the conductive material such as carbon black, the negative electrode material may be represented by only the mesopore/macropore specific surface area, not by the weight-average mesopore/macropore specific surface area. Of course, the mesopore/macropore specific surface area falls within the range between 10 m²/g and 85 m²/g. The dope and de-dope of the lithium ions is mainly involved with the active material described above. Although the conductive material is added in order to enhance conductivity, it also performs the dope and de-dope of the lithium ions, to be strict.

Each of the positive electrodes 20 has the positive electrode mixture member 21 formed on the current collector 22. A material that allows lithium ions and anions, which match the lithium ions such as BF4− and PF6−, to be reversibly doped and de-doped can be employed as a positive electrode active material contained in the positive electrode mixture member 21. Examples of the positive electrode active materials, which are the positive electrode materials, include activated carbon, conductive polymer, polyacene-based substance, etc. For example, the activated carbon that is subject to an alkali activation treatment with the use of salt of hydroxide of an alkali metal such as potassium hydroxide is preferable, because, when this activated carbon is used, the specific surface area can be increased more compared to the one that is not subject to the alkali activation treatment. The conductive material may be used for the active material, if needed. The positive electrode active material described above may be used alone or plural positive electrode active materials may be mixed, in accordance with the purpose.

The constituent of the negative electrode mixture member and the positive electrode mixture member described above further includes a binder. Examples of the binder include a rubber-based binder, a fluorine-containing resin, a thermoplastic resin, and an acrylic resin. Examples of the rubber-based binder include SBR and NBR that are a diene polymer. Examples of the fluorine-containing resin may include polytetrafluoroethylene (PTFE), polyvinylidene fluoride (PVdF), etc. Examples of the thermoplastic resin may include polypropylene, polyethylene, etc. Examples of the acrylic resin may include acrylic acid 2-ethylhexyl, and a copolymer of methacrylic acid, acrylonitrile, and ethylene glycol dimethacrylate.

Examples of the conductive material, which is used in the negative electrode mixture member and the positive electrode mixture member, include a carbon black such as acetylene black or ketjen black, and a conductive carbon material such as a expanded graphite, carbon fiber and carbon nano-tube. The negative electrode mixture member and the positive electrode mixture member may include carboxyl methyl cellulose (CMC) as a thickener.

The above-mentioned active materials, binder, and if necessary, conductive material or thickener are dispersed into water or a solvent such as N-methyl-2-pyrrolidone to obtain a slurry. The negative electrode mixture member and the positive electrode mixture member, which are formed into the slurry, are coated over the perforated current collector with a predetermined thickness. The positive electrode mixture member and the negative electrode mixture member may be, coated with the use of a coating apparatus such as a die coater or a comma coater. The mixture material layer coated over the current collector with a predetermined thickness is dried for 12 hours under the temperature of 150° C. to 200° C. in a vacuum, although depending upon the heat resistance of the binder, whereby the electrode is formed.

The negative electrodes and the positive electrodes thus formed are provided through the electrolyte solution. An electrolyte is dissolved in the electrolyte solution. In the case of the lithium ion capacitor, the electrolyte solution can be made of aprotic polar solvent. The aprotic polar solvent forms aprotic organic electrolyte solution. Examples of the aprotic polar solvent include ethylene carbonate, propylene carbonate, dimethyl carbonate, diethyl carbonate, ethyl methyl carbonate, γ-butyloractone, acetonitrile, dimethoxyethane, tetrahydrofuran, dioxolane, methylene chloride, sulfolane, etc.

In addition, a mixed solvent having at least two types of these aprotic polar solvents can be used. From the viewpoint of relative permittivity contributing to the charging/discharging characteristic, a freezing point and boiling point contributing to the temperature range in which the electric storage device can operate, and a burning point contributing to safety, propylene carbonate is preferably used. However, when a graphite is used for the active material of the negative electrode, ethylene carbonate is preferably used as a substitute for the propylene carbonate, since the propylene carbonate is decomposed on the graphite at the potential of about 0.8 V (vs. Li/Li+) of the negative electrode.

The melting point of ethylene carbonate is 36° C., so that it is solid at room temperature. Therefore, when the ethylene carbonate is used as the solvent of the electrolytic solution, it has to be mixed with the aprotic polar solvent other than ethylene carbonate in order to make the ethylene carbonate liquid at room temperature. An aprotic polar solvent having low viscosity and low freezing point, represented by diethyl carbonate or ethyl methyl carbonate, is preferably selected for the aprotic polar solvent used with the ethylene carbonate, from the viewpoint of charging/discharging characteristic and the temperature range in which the electric storage device can operate.

However, the electrolyte solution containing the aprotic polar solvent, which has low viscosity and low freezing point such as diethyl carbonate, and ethylene carbonate causes a sharp reduction in ion conductivity due to the solidification of the ethylene carbonate, when the ambient temperature becomes about −10° C. or lower. Therefore, the low-temperature characteristic of the electric storage device is likely to deteriorate. Accordingly, it is desirable to use propylene carbonate for the aprotic polar solvent of the electrolyte solution in order to obtain an electric storage device having satisfactory property even under the environment of −30° C.

Therefore, the material having low reductive decomposition characteristic of propylene carbonate is desirably used for the active material of the negative electrode and the conductive material. In the present invention, the material having the large surface area is used in which the weight-average mesopore/macropore specific surface area is set within the range between 10 m²/g and 85 m²/g. When the material described above is used, the cell is likely to expand due to the generation of the decomposed gas from the component of the electrolyte solution during the pre-doping process of the lithium ions as described above. Accordingly, in the present invention, the pre-doping speed is increased, whereby the expansion of the electric storage device during the pre-doping process of the lithium ions can be reduced and suppressed.

An electrolyte to be dissolved in the electrolyte solution has to be any type of electrolytes as long as it is able to generate lithium ions. Examples of the electrolyte include $LiClO_4$, $LiAsF_6$, $LiBF_4$, $LiPF_6$, $LiN(C_2F_5SO_2)_2$, $LiN(CF_3SO_2)_2$, etc. The electrolyte may be used alone or plural electrolytes may be mixed. If the electrolyte that can generate lithium ions is contained in the electrolyte solution as described above, the electrolyte by which cations become quaternary ammonium ion or spiro(1,1')-bipyridinium ion to such a degree of not adversely affecting the property may be added to the electrolyte solution.

In order to enhance the property, the additive such as vinylene carbonate, fluoroethylene carbonate, ethylene sulfite, or the derivative thereof may be added to the electrolyte solution. The additive amount is preferably between 0.1 weight percent and 10 weight percent. As an additive agent for giving flame resistance to the electric storage device, phosphazene compound or phosphazene derivative, fluorinated carboxylate ester, fluorinated phosphate ester, etc. may be added to the electrolyte solution. Examples of the additive agent for giving flame resistance to the electric storage device include Hoslite (manufactured by Nippon Chemical Industrial Co., Ltd.), $(CF_3CH_2O)_3PO$, $(HCF_2CF_2CH_2O)_2CO$, etc.

A metal lithium or lithium-aluminum alloy, for example, may be used for the lithium electrode 10 as the lithium ion source for pre-doping the lithium ions into the negative electrode 30 at the initial charging. Specifically, the material that contains at least lithium elements and can supply lithium ions can be used.

A separator is provided between each of the negative electrodes and each of the positive electrodes, and between the lithium electrode and the negative electrode. A porous member or the like, having great ion permeation rate (air permeability), predetermined mechanical strength, durability with respect to the electrolyte solution, positive electrode active material, negative electrode active material, or the like, having through-holes and having no electron conductivity, can be used for the separator. Generally, paper (cellulose), a cloth or nonwoven fabric having a gap and made of glass fiber, polyethylene, polypropylene, polystyrene, polyester, polytetrafluoroethylene, polyvinylidene difluoride, polyimide, polyphenylene sulfide, polyamide, polyamide imide, polyethylene terephthalate, polybutylene terephthalate, polyether, ether ketone, etc., or microporous body is used. The thickness of the separator can appropriately be set considering the holding amount of the electrolyte solution, strength of the separator, or the like. The thickness of the separator is preferably reduced as much as possible in order to reduce the DC resistance and enhance the energy density per volume. In the present invention, air permeability of some level is needed to increase the pre-doping speed. For example, the air permeability is preferably between 5 seconds/100 mL and 600 seconds/100 mL in order to realize the speedy pre-dope and reduction in the DC resistance. It is preferable from the viewpoint of safety that the separator has a characteristic called shut-down function of the separator in which, when the internal temperature of the electric storage device reaches the upper-limit temperature specified in the specification, the gap portion of the separator is sealed by the melting of the constituent of the separator. Although depending upon the specification of the electric storage device, the temperature at which the sealing is started is generally between 90° C. and 180° C. When the material, such as polyimide, that is difficult to be melted at the temperature described above is used for the separator, it is preferable that the material capable of being melted at the temperature described above, such as polyethylene, is mixed in the separator. The mixture here means not only the case in which a plurality of materials are merely mixed, but also the case in which two or more types of separators, each being made of different material, are stacked, or the case in which the materials of the separator are copolymerized. The separator having small heat shrinkage even if the internal temperature of the electric storage device exceeds the specified upper-limit temperature is more preferable from the viewpoint of safety. The separator described above may be used alone or separators of the same type may be stacked, in accordance with the purpose and specification. The separators of plural types may be stacked for use.

The lithium ion capacitor formed into the stacked-type unit has been described above. The lithium ion capacitor of the present invention may be formed into a wound type in which a negative electrode and a positive electrode are overlapped with a separator interposed between them, and they are wound. FIG. 2 illustrates the case in which the lithium electrode is provided to face the negative electrode that is arranged at the outermost part of the stacked electrode structure. However, the lithium electrode may be formed so as to be sandwiched between the electrodes in the stacked electrode structure. The arrangement structure of the electrodes is basically free, so long as it can reduce or suppress the expansion of the cell caused by the generation of the gas from the component of the electrolyte solution during the pre-doping process.

Specifically, when the negative electrode material having the weight-average mesopore/macropore specific surface area within the specific range, which is between 10 $m^2$/g and 85 $m^2$/g, more preferably between 10 $m^2$/g and 35 $m^2$/g, is used for the negative electrode, the product of the ratio of the number of the negative electrodes to one lithium electrode facing the electrode unit and the logarithm of the combined air permeability may be 50 or less, more preferably between 5 and 40. If the product has the above-mentioned value or less, the expansion of the electric storage device, which is caused by the generation of the decomposed gas from the component of the electrolyte solution, can be reduced and suppressed, even if the material having the weight-average mesopore/macropore specific surface area within the range of between 10 $m^2$/g and 85 $m^2$/g is used for the negative electrode in the cell structure having a stacked unit including plural negative electrodes and plural positive electrodes, which are stacked, and one lithium electrode.

So long as the above-mentioned negative electrode structure is satisfied, not only one lithium electrode but also plural lithium electrodes, serving as the ion source for pre-doping the lithium ions, may be provided. For example, two lithium electrodes may be provided at both ends of the electrode unit. Alternatively, the lithium electrodes may be interposed at the middle of the electrode unit. Further, plural lithium electrodes may be provided at both ends of the electrode unit and at the middle of the electrode unit.

The lithium ion capacitor having the above-mentioned structure including the negative electrode, which has the weight-average mesopore/macropore specific surface area including the mesopore/macropore specific surface area, described in the present embodiment, is well adaptable to, for example, an electric vehicle, hybrid electric vehicle, auxiliary power in a building site equipment, power source of an overnight lighting device, power storage device in wind generation, USP, an electric component in an electric device that is required to be rapidly heated in a short period of several seconds to several minutes or charging/discharging with high current.

Embodiment 2

Figure 3:
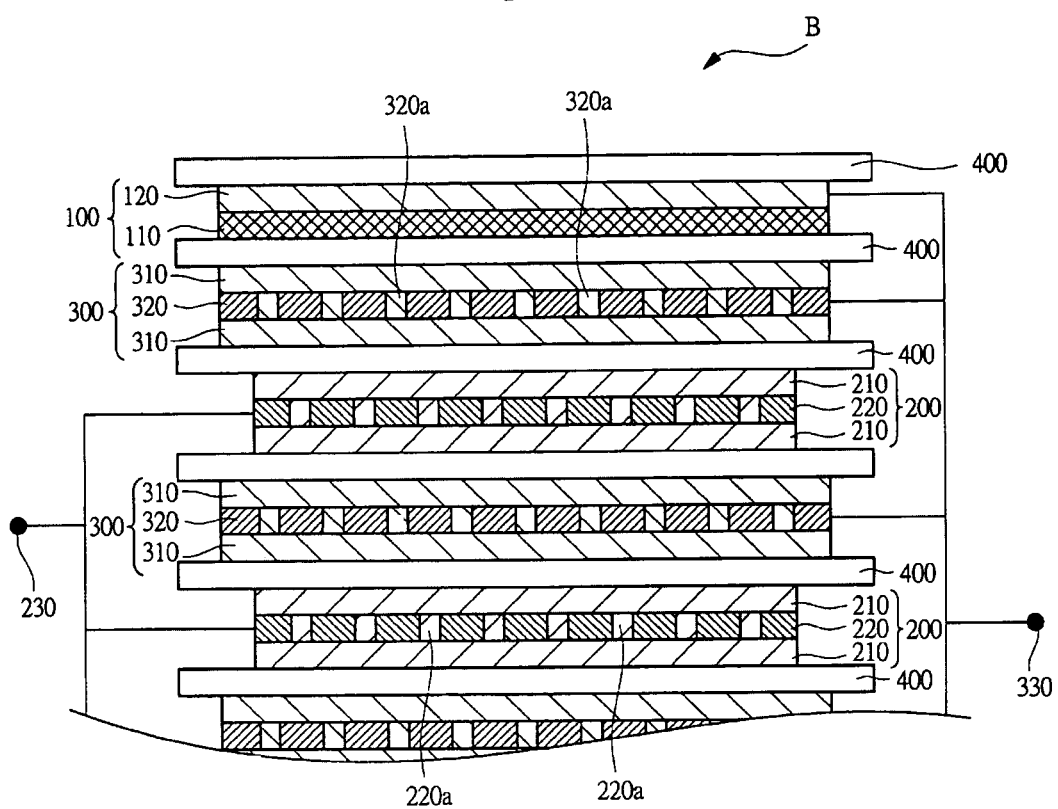
FIG. 3 is a diagram schematically illustrating an electrode structure when the lithium ion electric storage device is configured as a lithium ion secondary battery.

In the present embodiment, the electric storage device is configured to be a lithium ion secondary battery B. As illustrated in FIG. 3, the lithium ion secondary battery B is configured to be a stacked type. The lithium ion secondary battery B includes lithium electrodes 100, positive electrodes 200, and negative electrodes 300. A plurality of positive electrodes 200 and negative electrodes 300 are alternately stacked in a state that a separator 400 is interposed between each of the positive electrodes 200 and each of the negative electrodes 300. The negative electrode 300 is provided at the outermost part of the stacked electrode group. The lithium electrode 100 serving as an ion source is provided so as to face the negative electrode 300 arranged at the outermost part of the stacked structure through the separator 400. The stacked unit described above is soaked in electrolyte solution.

As illustrated in FIG. 3, the lithium electrode 100 has, for example, a metal lithium 110 mounted on a current collector 120 with a predetermined thickness. Each of the positive electrodes 200 has a positive electrode mixture member 210 formed on both surfaces of a current collector 220 with a predetermined thickness. Each of the negative electrodes 300 also has a negative electrode mixture member 310 formed on both surfaces of a current collector 320 with a predetermined thickness. The current collectors 220 and 320 are porous members having holes passing from the front to the reverse side thereof as illustrated in FIG. 3. Specifically, the current collectors 220 and 320 are provided with a great number of through-holes 220a and 320a.

A positive electrode terminal 230 is provided at each of the positive electrodes 200 so as to extend from the current collector 220. A negative electrode terminal 330 is provided at each of the negative electrodes 300 so as to extend from the current collector 320. When the lithium ion secondary battery B is used, the positive electrode terminal 230 and the negative electrode terminal 330 are used. Thus, the lithium ion secondary battery B, which is a stacked-type unit including the positive electrodes 200 and the negative electrodes 300, is formed. The lithium ion secondary battery B thus configured is put into a package, which is an outer casing made of a laminate film, for example, whereby it becomes a product.

Before being made as a product, the lithium ion secondary battery B is pre-doped with lithium ions. Specifically, the lithium ion secondary battery is pre-doped during the assembling process thereof with the outer casing being sealed. The pre-dope is executed between the lithium electrodes 100 and the negative electrodes 300. The lithium ion secondary battery is shipped as a product with the lithium ions doped in advance into the negative electrodes 300.

In the lithium ion secondary battery B thus configured, the negative electrode material used in the Embodiment 1 is used for the negative electrode 300. Specifically, the negative electrode material described in the above-mentioned description is contained in the negative electrode mixture member 310 formed on both surfaces of the current collector 320 for the negative electrode. The negative electrode mixture member 310 contains a non-graphitizable carbon material serving as an active material, and carbon black serving as a conductive material. The negative electrode material containing the active material and the conductive material has the weight-average mesopore/macropore specific surface area within the range between 10 m$^2$/g and 85 m$^2$/g.

When the negative electrode mixture member 310 does not contain the conductive material such as carbon black, the negative electrode material may be represented by only the mesopore/macropore specific surface area, not by the weight-average mesopore/macropore specific surface area. It is to be noted that the mesopore/macropore specific surface area falls within the range between 10 m$^2$/g and 85 m$^2$/g. Although the conductive material is added in order to enhance conductivity, it also performs the dope and de-dope of the lithium ions, to be strict. Therefore, it functions as the active material in that sense.

In the lithium ion secondary battery B thus configured, each of the positive electrodes 200 has the positive electrode mixture member 210 formed on both surfaces of the current collector 220. Examples of the active material of the positive electrode composing the positive electrode mixture member 210 include a metal oxide that allows lithium ions to be reversibly doped or de-doped. Examples of the metal oxide include lithium cobalt oxide, lithium nickel oxide, lithium manganate, lithium iron phosphate, lithium nickel-manganese-cobalt oxide, lithium nickel-cobalt oxide, lithium nickel-manganese oxide, lithium iron-manganese oxide, lithium iron-manganese-cobalt oxide, lithium iron silicate, iron silicate-manganese lithium, vanadium oxide, niobium oxide, etc. The positive electrode active material described above may be used alone or plural positive electrode active materials may be mixed, in accordance with the purpose.

From the viewpoint that the lithium ion secondary battery is required to have high safety on the basis of the experience of excessive heat generation or ignition accidents of the lithium ion secondary battery, which have occurred frequently in recent years, the material that is difficult to emit oxygen from the structure even under a high temperature environment is preferable. Among these materials, lithium iron phosphate and vanadium oxide are preferable. Vanadium pentoxide ($V_2O_5$) contained in the vanadium oxide has a structure in which a pentahedron unit having $VO_5$ as one unit spreads in the two-dimensional direction with a covalent bond so as to form one layer. The layers are stacked to form a layered structure as a whole. The lithium ions can be doped between the layers.

The lithium electrodes 100 include a material containing a lithium element and capable of supplying lithium ions, such as a metal lithium or lithium-aluminum alloy, as is described in the embodiment described above.

The negative electrode mixture member and the positive electrode mixture member employ a binder resin such as a rubber-based binder, a fluorine-containing resin, a thermoplastic resin, and an acrylic resin, as is described in the above-mentioned embodiment. Examples of the rubber-based binder include SBR and NBR that are a diene polymer. Examples of the fluorine-containing resin may include polytetrafluoroethylene (PTFE), polyvinylidene fluoride (PVdF), etc. Examples of the thermoplastic resin may include polypropylene, polyethylene, etc. Examples of the acrylic resin may include acrylic acid 2-ethylhexyl, and a copolymer of methacrylic acid, acrylonitrile, and ethylene glycol dimethacrylate.

When vanadium oxide is used for the positive electrode active material used in the lithium ion secondary battery, the binder has to be dissolved or dispersed in a nonaqueous solvent for use, since the vanadium oxide is dissolved into water.

Examples of the conductive material, which is used in the negative electrode mixture member and the positive electrode mixture member, include a carbon black such as acetylene black or ketjen black, and a conductive carbon material such as an expanded graphite, scale-like graphite microparticle, carbon fiber, carbon nano-tube, etc. The negative electrode mixture member and the positive electrode mixture member may include carboxyl methyl cellulose (CMC) as a thickener.

The above-mentioned active materials, binder, and if necessary, conductive material are dispersed into water or an organic solvent such as N-methyl-2-pyrrolidone to obtain a slurry. The negative electrode mixture member and the positive electrode mixture member, which are formed into the slurry, are coated over the perforated current collector with a predetermined thickness. The positive electrode mixture member and the negative electrode mixture member may be coated with the use of a coating apparatus such as a die coater or comma coater. The mixture material layer coated over the current collector with a predetermined thickness is dried for about 12 hours under the temperature of 150° C. to 200° C. in a vacuum, although depending upon the heat resistance of the binder, whereby the electrode is formed.

The negative electrodes and the positive electrodes thus formed are provided through the electrolyte solution. An electrolyte is dissolved in the electrolyte solution. In the case of the lithium ion secondary battery, the electrolyte solution can be made of aprotic polar solvent. The aprotic polar solvent forms aprotic organic electrolyte solution. Examples of the aprotic polar solvent include ethylene carbonate, propylene carbonate, dimethyl carbonate, diethyl carbonate, ethyl methyl carbonate, γ-butyloractone, acetonitrile, dimethoxyethane, tetrahydrofuran, dioxolane, methylene chloride, sulfolane, etc.

From the viewpoint of relative permittivity contributing to the charging/discharging characteristic, a freezing point and boiling point contributing to the temperature range in which the electric storage device can operate, and a burning point contributing to safety, propylene carbonate is preferably used. However, when a graphite is used for the active material of the negative electrode, ethylene carbonate is preferably used as a substitute for the propylene carbonate, since the propylene carbonate is decomposed on the graphite at the potential of about 0.8 V (vs. Li/Li+) of the negative electrode. The melting point of ethylene carbonate is 36° C., so that it is solid at room temperature. Therefore, when the ethylene carbonate is used as the solvent of the electrolytic solution, it has to be mixed with the aprotic polar solvent other than ethylene carbonate in order to make the ethylene carbonate liquid at room temperature.

An aprotic polar solvent having low viscosity and low freezing point, represented by diethyl carbonate or ethyl methyl carbonate, is preferably selected for the aprotic polar solvent used with the ethylene carbonate, from the viewpoint of charging/discharging characteristic and the temperature range in which the electric storage device can operate. However, the electrolyte solution containing ethylene carbonate and the aprotic polar solvent having low viscosity and low freezing point such as diethyl carbonate causes a sharp reduction in ion conductivity due to the solidification of the ethylene carbonate, when the ambient temperature becomes about −10° C. or lower. Therefore, the low-temperature characteristic is likely to deteriorate. Accordingly, it is desirable to use propylene carbonate for the aprotic polar solvent of the electrolyte solution in order to obtain an electric storage device having satisfactory property even under the environment of −30° C. Therefore, the material having low reductive decomposition characteristic of propylene carbonate is desirably used for the active material of the negative electrode and the conductive material.

An electrolyte to be dissolved in the electrolyte solution may be any type of electrolytes as long as it is able to generate lithium ions. Examples of the electrolyte include $LiClO_4$, $LiAsF_6$, $LiBF_4$, $LiPF_6$, $LiN(C_2F_5SO_2)_2$, $LiN(CF_3SO_2)_2$, etc. The electrolyte may be used alone or plural electrolytes may be mixed. The electrolyte layer interposed between the positive electrode and the negative electrode may be an aprotic organic electrolyte solution having the electrolyte dissolved therein as described above. The electrolyte layer may be a polymer gel (polymer gel electrolyte) containing the electrolyte solution. The electrolyte solution that can allow the lithium ions to smoothly move between the positive electrode and the negative electrode can be used. In order to enhance the property, the additive such as vinylene carbonate, fluoroethylene carbonate, ethylene sulfite, or the derivative thereof may be added to the electrolyte solution. The additive amount is preferably between 0.1 weight percent and 10 weight percent. As an additive agent for giving flame resistance to the electric storage device, phosphazene compound or phosphazene derivative, fluorinated carboxylate ester, fluorinated phosphate ester, etc. may be added to the electrolyte solution. Examples of the additive agent for giving flame resistance to the electric storage device include Hoslite (manufactured by Nippon Chemical Industrial Co., Ltd.), $(CF_3CH_2O)_3PO$, $(HCF_2CF_2CH_2O)_2CO_3$ etc.

A porous member or the like, having great ion permeation rate (air permeability), predetermined mechanical strength, durability with respect to the electrolyte solution, positive electrode active material, negative electrode active material, or the like, having through-holes and having no electron conductivity, can be used for the separator provided between the negative electrode and the positive electrode and between the negative electrode and the lithium electrode. Generally, paper (cellulose), a cloth or nonwoven fabric having a gap and made of glass fiber, polyethylene, polypropylene, polystyrene, polyester, polytetrafluoroethylene, polyvinylidene difluoride, polyimide, polyphenylene sulfide, polyamide, polyamide imide, polyethylene terephthalate, polybutylene terephthalate, polyether, ether ketone, etc., or microporous body is used. The thickness of the separator can appropriately be set considering the holding amount of the electrolyte solution, strength of the separator, or the like. The thickness of the separator is preferably reduced as much as possible in order to reduce the DC resistance and enhance the energy density per volume. In the present invention, air permeability of some level is needed to increase the pre-doping speed. For example, the air permeability is preferably between 5 seconds/100 mL and 600 seconds/100 mL in order to realize the speedy pre-dope and reduction in the DC resistance.

It is preferable from the viewpoint of safety that the separator has a characteristic called shut-down function of the separator in which, when the internal temperature of the electric storage device reaches the upper-limit temperature specified in the specification, the gap portion of the separator is sealed by the melting of the constituent of the separator. Although depending upon the specification of the electric storage device, the temperature at which the sealing is started is generally between 90° C. and 180° C. When the material, such as polyimide, that is difficult to be melted at the temperature described above is used for the separator, it is preferable that the material capable of being melted at the temperature described above, such as polyethylene, is mixed in the separator. The mixture here means not only the case in which a plurality of materials are merely mixed, but also the case in which two or more types of separators, each being made of different material, are stacked, or the case in which the materials of the separator are copolymerized. The separator having small heat shrinkage even if the internal temperature of the electric storage device exceeds the specified upper-limit temperature is more preferable from the viewpoint of safety. The separator described above may be used alone or separators of the same type may be stacked, in accordance with the purpose and specification. The separators of plural types may be stacked for use.

The lithium ion secondary battery formed into the stacked-type unit has been described above. The lithium ion secondary battery of the present invention may be formed into a wound type in which a negative electrode and a positive electrode are overlapped with a separator interposed between them, and they are wound. FIG. 3 illustrates the case in which the lithium electrode is provided to face the negative electrode that is arranged at the outermost part of the stacked electrode structure. However, the lithium electrode may be formed so as to be sandwiched between the stacked electrode structure. The electrodes may basically have any arrangement structure, so long as it can reduce or suppress the expansion of the cell caused by the generation of the gas from the component of the electrolyte solution during the pre-doping process.

Specifically, when the negative electrode material having the weight-average mesopore/macropore specific surface area within the specific range, which is between 10 $m^2/g$ and 85 $m^2/g$, more preferably between 10 $m^2/g$ and 35 $m^2/g$, is used for the negative electrode, the product of the ratio of the number of the negative electrodes to one lithium electrode facing the electrode unit and the logarithm of the combined air permeability may be 50 or less, more preferably between 5 and 40. If the product is 50 or less, the expansion of the electric storage device, which is caused by the generation of the decomposed gas from the component of the electrolyte solution, can be reduced and suppressed, even if the material having the weight-average mesopore/macropore specific surface area within the range between 10 $m^2/g$ and 85 $m^2/g$ is used for the negative electrode in the cell structure having a stacked unit including plural negative electrodes and plural positive electrodes, which are stacked, and one lithium electrode.

The lithium ion secondary battery having the above-mentioned structure including the negative electrode, which uses the negative electrode material having the weight-average mesopore/macropore specific surface area including the mesopore/macropore specific surface area within the specific range, described in the present embodiment, is well adaptable to, for example, a product having an electric storage device mounted thereon, such as an electric vehicle or power tool.

Examples

The Examples were conducted for verifying the effectiveness of the structure of the lithium ion capacitor described in the above-mentioned embodiment. The effectiveness will be described in detail according to the Examples based upon the experiment described below. The same result was obtained for the lithium ion secondary battery, so that the description thereof as the Example is omitted.

Example 1

In the Example 1, plural lithium ion capacitors were produced, and the experiment was conducted. Each of the lithium ion capacitors includes a positive electrode whose average air permeability is greatly different from one another. The negative electrode material used for the negative electrode of each of the lithium ion capacitors allows lithium ions to be doped and de-doped. Further, the negative electrode material used for the negative electrode of each of the lithium ion capacitors has a weight-average mesopore/macropore specific surface area within the specific range. In the respective lithium ion capacitors, the combined air permeability and the number of the negative electrodes to one lithium electrode facing the electrode unit, i.e., the numerical index X, is different from one another.

In the lithium ion capacitor, after a cell was completed, a lithium electrode terminal and a negative electrode terminal were short-circuited so as to dope lithium ions into the negative electrode from the lithium electrode provided in the cell for doping the lithium ions. The amount of pre-doped lithium ions to the negative electrode was set to an amount by which the potential of the negative electrode became 0.02 V (vs. Li/Li+) when voltage of 3.8 V was applied between the positive electrode and the negative electrode after the completion of the pre-dope of the lithium ions. It was controlled by adjusting the thickness of the metal lithium foil press-bonded on a lithium electrode current collector.

The detail of the lithium ion capacitors used in the Experimental Examples 1 to 15 and Comparative Examples 1 to 6 in the Example 1 will be described below. The same electrolyte solution and the same separator were used in the Experimental Examples 1 to 15 and Comparative Examples 1 to 6.

Experimental Example 1

Preparation of Positive Electrode Slurry

An activated carbon was used for the positive electrode. Acetylene black, thickener, and binder-emulsion were mixed with the activated carbon with water used as a solvent, to thereby prepare a positive electrode slurry.

[Fabrication of Positive Electrode 1]

The positive electrode slurry was applied onto both surfaces of a current collector base, which was formed by applying a carbon-based conductive coating agent onto both surfaces of an aluminum expanded metal provided with through-holes and having a thickness of 35 µm, with a thickness of 105 µm so as to form a positive electrode. The obtained electrode was dried under reduced pressure.

[Fabrication of Negative Electrode 1]

A carbon black, having a dibutyl phthalate oil absorption of 123 mL/100 g, and a primary particle diameter of 23 nm, was used for the negative electrode. By a heating kneader 100 parts by weight of the carbon black and 50 parts by weight of pitch were kneaded, and the resultant was burned under a non-oxidizing atmosphere at 800° C. The obtained carbon precursor was pulverized, and then, the resultant was burned again under the non-oxidizing atmosphere at 1000° C., thereby obtaining a negative electrode active material. The mesopore/macropore specific surface area of this material was 39 $m^2/g$.

Acetylene black (special pressed product HS-100) manufactured by Denki Kagaku Kogyo Kabushiki Kaisha, and having the mesopore/macropore specific surface area of 24 $m^2/g$, was prepared as a conductive material. One hundred parts by weight of the above-mentioned active material and seven parts by weight of the acetylene black were mixed to form a negative electrode precursor. The weight-average mesopore/macropore specific surface area of the carbon contained in the negative electrode was 38 $m^2/g$.

Carboxyl methyl cellulose, and latex of SBR rubber binder were mixed with the negative electrode precursor with water used as a solvent, to thereby prepare a slurry of a negative electrode 1. Both surfaces of a copper expanded metal having through-holes were coated with the slurry of the negative electrode 1 in such a manner that the electrode thickness became 78 µm, to thereby obtain a negative electrode. The obtained electrode was dried under reduced pressure.

[Fabrication of Lithium Electrode]

A metal lithium foil, having a size of 4.0×4.0 $cm^2$ and a predetermined thickness, was press-bonded to the copper expanded metal that was cut out in a size of 4.2×4.2 $cm^2$ with a thickness of 25 µm, whereby a lithium electrode used for pre-doping the lithium ions was formed. A metal lithium foil, having a size of 4.0×4.0 $cm^2$ and a thickness of 120 µm, was press-bonded to the copper expanded metal having a thickness of 25 µm, whereby a lithium electrode used for monitoring the potential of the negative electrode during the pre-dope of the lithium ions was formed.

[Fabrication of Electrode Unit]

Plural positive electrodes 1 were cut out in a size of 4.0×4.0 cm². Plural negative electrodes 1 were cut out in a size of 4.2×4.2 cm². The positive electrodes and the negative electrodes were stacked in such a manner that a sheet separator, having a thickness of 50 μm and an average air permeability of 7 seconds/100 mL manufactured by Nippon Kodoshi Corporation, was interposed between each of the positive electrodes and each of the negative electrodes. The edge portions at both outer sides of the stacked unit were fixed with a polyimide adhesive tape to thereby form an electrode unit.

[Fabrication of Cell]

Figure 4:
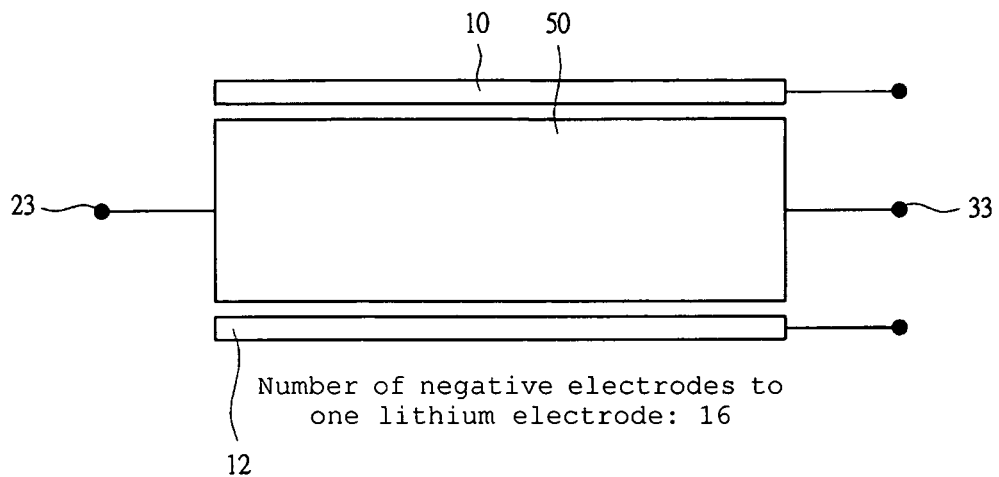
FIG. 4 is an explanatory view schematically illustrating a configuration of an electrode unit of the electric storage device.

Firstly, 15 positive electrodes 1 cut into a predetermined size, 16 negative electrodes 1 cut into a predetermined size, and the separators were used to form an electrode unit in the Experimental Example 1. As illustrated in FIG. 4, each of the positive electrodes and each of the negative electrodes were alternately stacked with the separator interposed therebetween, to thereby form an electrode unit 50. One lithium electrode 10 was arranged at the outer side of the electrode unit 50, and the lithium electrode 12 used for monitoring the potential was arranged at the other outer side of the electrode unit 50 reverse to the side where the lithium electrode 10 was arranged. Then, with the use of a sheet separator having a thickness of 35 μm, the outer periphery of the lithium electrode 10 used for the pre-dope, the electrode unit 50, and the lithium electrode 12 used for monitoring the potential was covered, and the portion where the separators were overlapped was fixed with the polyimide adhesive tape, whereby an electrode device was formed.

Respective terminals were welded to the positive electrode terminal welding part 23, negative electrode terminal welding part 33, the lithium electrode 10, and the lithium electrode 12 used for monitoring the potential, and then, the electrode device was covered by a pair of aluminum laminate films, which serves as an outer casing. Thereafter, three sides of the outer casing were heat-sealed. Next, electrolyte solution, which was obtained by dissolving $LiPF_6$ into propylene carbonate in such a manner that the concentration became 1.2 mol/L, was injected, and the impregnation under reduced pressure was performed. Thereafter, the remaining one side of the aluminum laminate film serving as the outer casing was heat-sealed under vacuum, whereby a lithium ion capacitor cell (sometimes referred to as LIC cell) according to the Experimental Example 1 was formed.

Experimental Example 2

Figure 5:
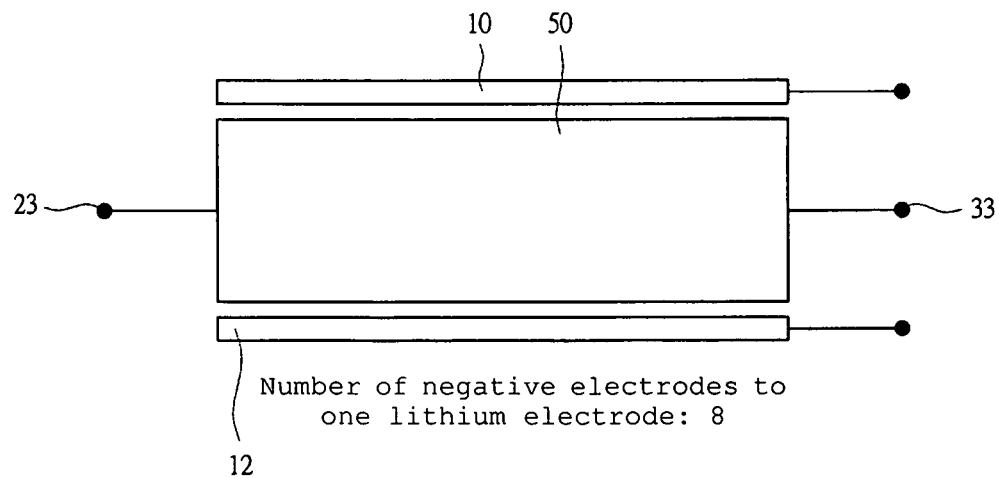
FIG. 5 is an explanatory view schematically illustrating a configuration of an electrode unit of the electric storage device.

Firstly, 14 positive electrodes 1 having a predetermined size and 16 negative electrodes 1 having a predetermined size were cut out. Among the cut-out electrodes, 7 positive electrodes 1, 8 negative electrodes 1, and the separators described in the Experimental Example 1 were used to form one electrode unit 60a. Another electrode unit 60a having the configuration described above was formed by repeating the procedure described above. Next, the lithium electrode 10 used for the pre-dope of the lithium ions was arranged between two electrode units 60a as illustrated in FIG. 5, whereby an electrode unit group 60 was formed. The lithium electrode 12 for monitoring the potential was arranged at the outside of the electrode unit group 60. Then, the outer periphery of the lithium electrode 12 and the electrode unit group 60 was covered with the sheet separator described in the Experimental Example 1. Then, a lithium ion capacitor cell according to the Experimental Example 2 was formed in the same manner as in the Experimental Example 1.

Experimental Example 3

Figure 6:
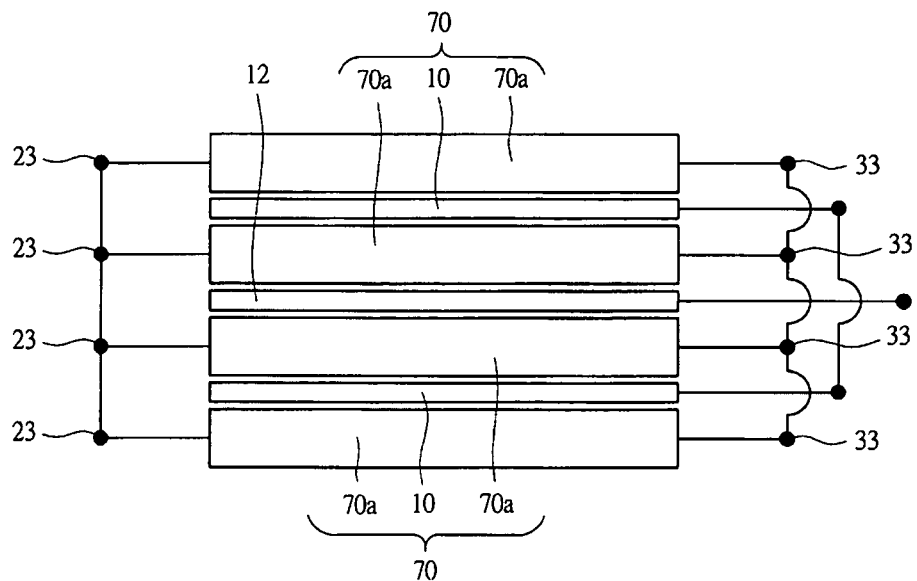
FIG. 6 is an explanatory view schematically illustrating a configuration of an electrode unit of the electric storage device.

Firstly, 12 positive electrodes 1 having a predetermined size and 16 negative electrodes 1 having a predetermined size were cut out. Among the cut-out electrodes, 3 positive electrodes 1, 4 negative electrodes 1, and the separators described in the Experimental Example 1 were used to form one electrode unit 70a. Another three electrode units 70a having the configuration described above were formed by repeating the procedure described above. Next, the lithium electrode 10 used for the pre-dope of the lithium ions was arranged between two electrode units 70a as illustrated in FIG. 6, whereby two electrode unit groups 70 were formed. The lithium electrode 12 for monitoring the potential was arranged between the electrode unit groups 70. Then, the outer periphery of the lithium electrode 12 and two electrode unit groups 70 was covered with the sheet separator described in the Experimental Example 1. Then, a lithium ion capacitor cell according to the Experimental Example 3 was formed in the same manner as in the Experimental Example 1.

Experimental Example 4

Figure 7:
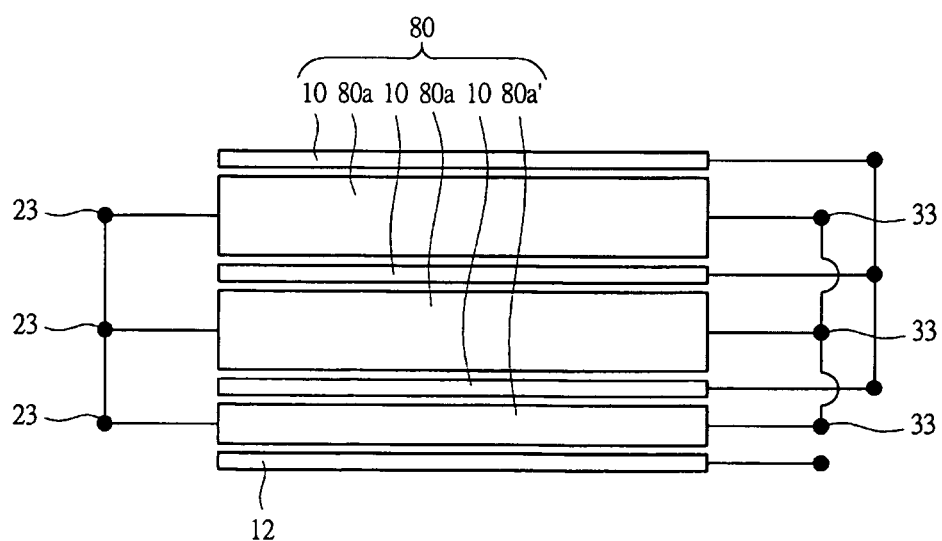
FIG. 7 is an explanatory view schematically illustrating a configuration of an electrode unit of the electric storage device.

Firstly, 12 positive electrodes 1 having a predetermined size and 15 negative electrodes 1 having a predetermined size were cut out. Among the cut-out electrodes, 5 positive electrodes 1, 6 negative electrodes 1, and the separators described in the Experimental Example 1 were used to form one electrode unit 80a. Another electrode unit 80a having the configuration described above was formed by repeating the procedure described above. Next, the remaining 2 positive electrodes 1, and 3 negative electrodes 1 were used to form an electrode unit 80a'. As illustrated in FIG. 7, the lithium electrodes 10 used for the pre-dope of the lithium ions were arranged at both sides of one electrode unit 80a. Subsequently, another electrode unit 80a was overlapped with the electrode unit 80a having the lithium electrode 10 arranged thereon, and the lithium electrode 10 used for the pre-dope of the lithium ions was arranged at the outside of the overlapped electrode unit 80a, whereby an electrode group was formed. Thereafter, the electrode unit 80a' was overlapped on the outside of the electrode group to form an electrode unit group 80. The lithium electrode 12 for monitoring the potential was arranged at the outside of the electrode unit group 80. Then, the outer periphery of the lithium electrode 12 and the electrode unit group 80 was covered with the sheet separator described in the Experimental Example 1. Then, a lithium ion capacitor cell according to the Experimental Example 4 was formed in the same manner as in the Experimental Example 1.

Experimental Example 5

Fabrication of Positive Electrode 2

An aluminum foil having a thickness of 50 μm was subject to a chemical etching to form through-holes. Both surfaces of the aluminum foil were coated with the positive electrode slurry, which was used for forming the positive electrode 1, in such a manner that the electrode thickness became 105 μm, to thereby obtain a positive electrode. The obtained electrode was dried under reduced pressure.

[Fabrication of Cell]

A lithium ion capacitor cell according to the Experimental Example 5 was formed in the same manner as in the Experimental Example 1 except that the positive electrode 2 was used for the positive electrode, the number of the positive electrodes used was 11, and the number of the negative electrodes used was 12.

Experimental Example 6

A lithium ion capacitor cell according to the Experimental Example 6 was formed in the same manner as in the Experimental Example 2 except that the positive electrode 2 was used for the positive electrode.

Experimental Example 7

A lithium ion capacitor cell according to the Experimental Example 7 was formed in the same manner as in the Experimental Example 3 except that the positive electrode 2 was used for the positive electrode.

Experimental Example 8

Fabrication of Positive Electrode 3

An aluminum foil having a thickness of 50 μm was subject to a chemical etching, which was different from the chemical etching to the positive electrode 2 in its degree, to form through-holes. Both surfaces of the aluminum foil were coated with the positive electrode slurry, which was used for forming the positive electrode 1, in such a manner that the electrode thickness became 105 μm, to thereby obtain a positive electrode. The obtained electrode was dried under reduced pressure.

[Fabrication of Cell]

A lithium ion capacitor cell according to the Experimental Example 8 was formed in the same manner as in the Experimental Example 2 except that the positive electrode 3 was used for the positive electrode.

Experimental Example 9

A lithium ion capacitor cell according to the Experimental Example 9 was formed in the same manner as in the Experimental Example 3 except that the positive electrode 3 was used for the positive electrode.

Experimental Example 10

Fabrication of Negative Electrode 2

A carbon black, having a dibutyl phthalate oil absorption of 140 mL/100 g, and a primary particle diameter of 48 nm, was used for the negative electrode. By a heating kneader 100 parts by weight of the carbon black and 100 parts by weight of pitch were kneaded, and the resultant was burned under a non-oxidizing atmosphere at 800° C. The obtained carbon precursor was pulverized, and then, the resultant was burned again under the non-oxidizing atmosphere at 1000° C., thereby obtaining a negative electrode active material. The mesopore/macropore specific surface area of this material was 10 $m^2/g$.

Acetylene black (special pressed product HS-100) manufactured by Denki Kagaku Kogyo Kabushiki Kaisha, and having the mesopore/macropore specific surface area of 24 $m^2/g$, was prepared as a conductive material, like the negative electrode 1. One hundred parts by weight of the above-mentioned active material and seven parts by weight of the acetylene black were mixed to form a negative electrode precursor. The weight-average mesopore/macropore specific surface area of the carbon contained in the negative electrode was 11 $m^2/g$.

Carboxyl methyl cellulose, and latex of SBR rubber binder were mixed with the negative electrode precursor with water used as a solvent, to thereby prepare a slurry of a negative electrode 2. Both surfaces of a copper expanded metal having through-holes were coated with the slurry of the negative electrode 2 in such a manner that the electrode thickness became 70 μm, to thereby obtain a negative electrode. The obtained electrode was dried under reduced pressure.

[Fabrication of Cell]

A lithium ion capacitor cell according to the Experimental Example 10 was formed in the same manner as in the Experimental Example 2 except that the positive electrode 3 was used for the positive electrode, and the negative electrode 2 was used for the negative electrode.

Experimental Example 11

A lithium ion capacitor cell according to the Experimental Example 11 was formed in the same manner as in the Experimental Example 2 except that the positive electrode 2 was used for the positive electrode, and the negative electrode 2 was used for the negative electrode.

Experimental Example 12

A lithium ion capacitor cell according to the Experimental Example 12 was formed in the same manner as in the Experimental Example 3 except that the positive electrode 2 was used for the positive electrode, and the negative electrode 2 was used for the negative electrode.

Experimental Example 13

A lithium ion capacitor cell according to the Experimental Example 13 was formed in the same manner as in the Experimental Example 1 except that the negative electrode 2 was used for the negative electrode.

Experimental Example 14

A lithium ion capacitor cell according to the Experimental Example 14 was formed in the same manner as in the Experimental Example 2 except that the negative electrode 2 was used for the negative electrode.

Experimental Example 15

A lithium ion capacitor cell according to the Experimental Example 15 was formed in the same manner as in the Experimental Example 3 except that the negative electrode 2 was used for the negative electrode.

Comparative Example 1

A lithium ion capacitor cell according to the Comparative Example 1 was formed in the same manner as in the Experimental Example 1 except that the positive electrode 3 was used for the positive electrode.

Comparative Example 2

A lithium ion capacitor cell according to the Comparative Example 2 was formed in the same manner as in the Experimental Example 1 except that the positive electrode 2 was used for the positive electrode.

Comparative Example 3

A lithium ion capacitor cell according to the Comparative Example 3 was formed in the same manner as in the Experimental Example 1 except that the positive electrode 3 was used for the positive electrode, the number of the positive electrodes used was 11, and the number of the negative electrodes used was 12.

Comparative Example 4

A lithium ion capacitor cell according to the Comparative Example 4 was formed in the same manner as in the Experimental Example 1 except that the positive electrode 2 was used for the positive electrode, and the negative electrode 2 was used for the negative electrode.

Comparative Example 5

A lithium ion capacitor cell according to the Comparative Example 5 was formed in the same manner as in the Experimental Example 1 except that the positive electrode 3 was used for the positive electrode, and the negative electrode 2 was used for the negative electrode.

Comparative Example 6

Method of Fabricating Negative Electrode 3

Carbotron P-s (F), which was manufactured by Kureha Corporation and which was non-graphitizable carbon, was pulverized by means of a ball mill to have an average particle diameter (D50%) of 2 μm. The obtained material was used as the negative electrode active material. The mesopore/macropore specific surface area of this material was 4 $m^2/g$.

Acetylene black (special pressed product HS-100) manufactured by Denki Kagaku Kogyo Kabushiki Kaisha, and having the mesopore/macropore specific surface area of 24 $m^2/g$, was prepared as a conductive material, like the negative electrode 1. One hundred parts by weight of the above-mentioned active material and seven parts by weight of the acetylene black were mixed to form a negative electrode precursor. The weight-average mesopore/macropore specific surface area of the carbon contained in the negative electrode was 5 $m^2/g$.

Carboxyl methyl cellulose, and latex of SBR rubber binder were mixed with the negative electrode precursor with water used as a solvent, to thereby prepare a slurry of a negative electrode 3. Both surfaces of a copper expanded metal having through-holes were coated with the slurry of the negative electrode 3 in such a manner that the electrode thickness became 55 μm, to thereby obtain a negative electrode 3. The obtained electrode was dried under reduced pressure.

[Method of Fabricating Cell]

A lithium ion capacitor cell according to the Comparative Example 6 was formed in the same manner as in the Experimental Example 1 except that the positive electrode 3 was used for the positive electrode, and the negative electrode 3 was used for the negative electrode.

Each of the lithium ion capacitors A thus configured has an appearance illustrated in FIG. 8A, for example. The central portion that bulges compared to the surrounding is a stacked portion 90 where the electrode unit (device) 50 and the lithium electrode 10 illustrated in FIG. 8 are housed. FIG. 8B is a plan view illustrating the appearance of the lithium ion capacitor A. In FIG. 8B, the thickness of the cell at the center of the stacked portion 90 was measured by means of a thickness gauge from the start of the pre-dope of the lithium ions at the respective times. When the measured value was increased, it was determined that the cell was expanded based upon the generation of the decomposed gas from the component of the electrolyte solution. Since the appearances of all cells were unchanged until the start of the pre-dope, it was supposed that the expansion of the cells caused by the generation of the decomposed gas from the component of the electrolyte solution did not occur until the start of the pre-dope.

FIG. 9 shows the weight-average mesopore/macropore specific surface areas of the negative electrode materials used in the Experimental Examples 1 to 15 and Comparative Examples 1 to 6 in the Example 1, and the numbers of the negative electrodes to one lithium electrode facing the electrode unit in the cells of the Experimental Examples 1 to 15 and Comparative Examples 1 to 6. FIG. 9 also shows the combined air permeabilities of the cells in the Experimental Examples 1 to 15 and Comparative Examples 1 to 6. The combined air permeability was obtained by measuring the air permeabilities of the positive electrode, the negative electrode, and the separator, after each cell was disassembled after the completion of the pre-dope. FIG. 9 also shows the numerical indexes X in the cells in the Experimental Examples 1 to 15 and Comparative Examples 1 to 6. The numerical index X was represented by the product of the number of the negative electrode layers to one lithium electrode and the logarithm of the combined air permeability.

Figure 10:
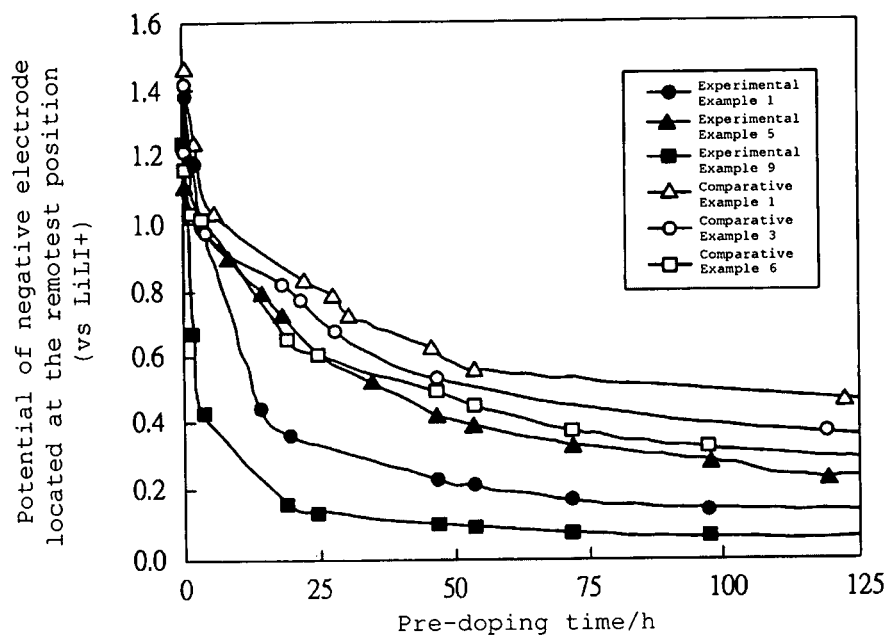
FIG. 10 is a diagram illustrating the result obtained by measuring the negative electrode potential from the start of the pre-dope of the lithium ions with the use of the lithium electrode used for monitoring the potential.

FIG. 10 is a diagram illustrating the result obtained by measuring the negative electrode potential from the start of the pre-dope of the lithium ions with the use of the lithium electrode 12 used for monitoring the potential. The negative electrode potential shown in FIG. 10 is the potential of the negative electrode located at the remotest position from the lithium electrode 10. FIG. 10 shows the measurement result of the LIC cells in the Experimental Example 1, Experimental Example 5, Experimental Example 9, Comparative Example 1, and Comparative Example 3, which were the representatives of the cells using the negative electrode material that had the weight-average mesopore/macropore specific surface area of 38 $m^2/g$ for the negative electrode, and measurement result of the LIC cells in the Comparative Example 6, which used the negative electrode material that had the weight-average mesopore/macropore specific surface area of 5 $m^2/g$ for the negative electrode.

As shown in FIGS. 9 and 10, when the numerical index X was set to be 50 or less, the negative electrode potential during the pre-doping process of the lithium ions could be lowered during a short period. When the numerical index X was set to be 40 or less, the negative electrode potential during the pre-doping process of the lithium ions could be lowered during a shorter period. Specifically, the lithium ion pre-doping speed can be accelerated by setting the numerical index X to be 50 or less, preferably 40 or less. Although not shown with data, it was confirmed that the lithium ion pre-doping process could be completed within about two weeks, when the numerical index X was set to be 50 or less.

When the numerical index X exceeded 50, the pre-doping process of the lithium ions was not completed even after two weeks has elapsed from the start of the pre-doping process of the lithium ions. Therefore, the cells in the Comparative Examples 1, 3 and 6 are undesirable from the viewpoint of productivity.

Figure 11:
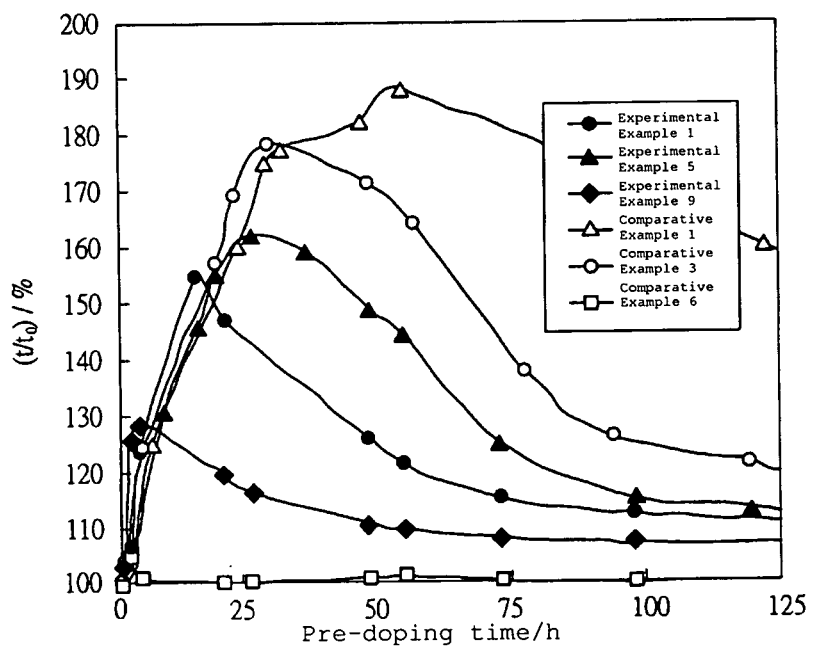
FIG. 11 is a diagram illustrating the behavior of the change in the cell thickness from the start of the pre-doping process of the lithium ions.

FIG. 11 is a diagram illustrating the behavior of the change in the cell thickness from the start of the pre-doping process of the lithium ions. FIG. 11 shows the measurement result of the LIC cells in the Experimental Example 1, Experimental Example 5, Experimental Example 9, Comparative Example 1, and Comparative Example 3, which used the negative electrode material that had the weight-average mesopore/macropore specific surface area of 38 m²/g for the negative electrode, and measurement result of the LIC cells in the Comparative Example 6, which used the negative electrode material that had the weight-average mesopore/macropore specific surface area of 5 m²/g for the negative electrode. The an axis of ordinate indicates t/t0 which represents the ratio of the cell thickness (t) at the point when a predetermined time has elapsed from the start of the pre-doping process of the lithium ions and the cell thickness (t0) at the beginning when the cell is completed. Specifically, the t/t0 means the expansion rate of the cell. The greater numerical value means that the cell is expanded by that much. From the result in FIG. 11, it is understood that the expansion of the cell is not caused by the positive electrode. From the results in FIGS. 10 and 11, when the numerical index X is set to be 50 or less, the pre-doping speed of the lithium ions is increased, whereby the maximum value of the t/t0 (tmax/t0), i.e., the expansion of the cell, can be reduced. When the numerical index X is set to be 40 or less, the pre-doping speed of the lithium ions can more be increased, whereby the expansion of the cell can more be reduced. It can be confirmed that, when the numerical index X is set to be 40 or less, the time when the t/t0 reaches the tmax/t0 can be gathered within about 24 hours from the start of the pre-doping process of the lithium ions.

Figure 12:
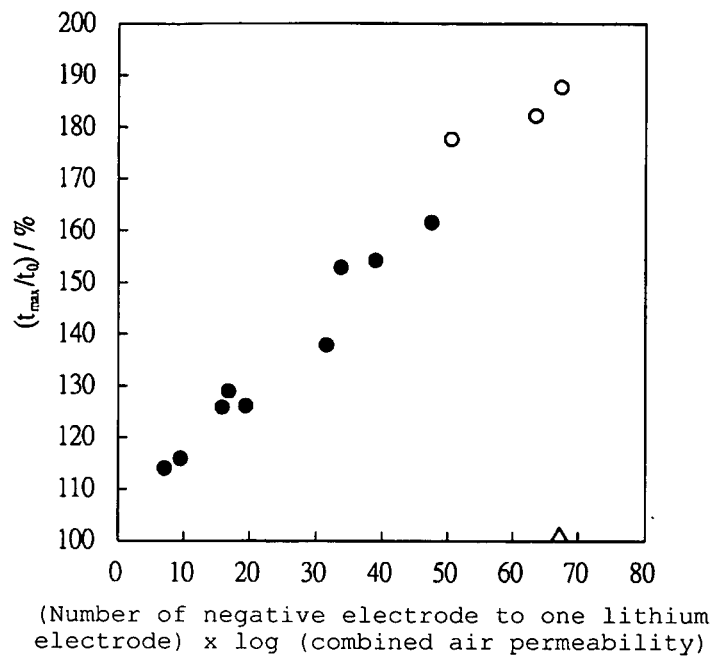
FIG. 12 is a diagram in which the numerical index X, which indicates the pre-doping speed of the lithium ions, and the maximum expansion rate of the cell during the pre-doping process of the lithium ions, are plotted.

FIG. 12 is a diagram in which the numerical index X, which indicates the pre-doping speed of the lithium ions and represents the manner of reducing the expansion of the electric storage device, and the maximum expansion rate tmax/t0 of the cell during the pre-doping process of the lithium ions, are plotted. FIG. 12 shows the results of the LIC cells in the Experimental Examples 1 to 9 and Comparative Examples 1 to 3, which used the negative electrode material that had the weight-average mesopore/macropore specific surface area of 38 m²/g for the negative electrode, and the result of the LIC cell in the Comparative Example 6, which used the negative electrode material that had the weight-average mesopore/macropore specific surface area of 5 m²/g for the negative electrode. In the figure, black circles indicate the LIC cells in the Experimental Examples 1 to 9, white circles indicate the LIC cells in the Comparative Examples 1 to 3, and a white triangle indicates the LIC cell in the Comparative Example 6.

Figure 13:
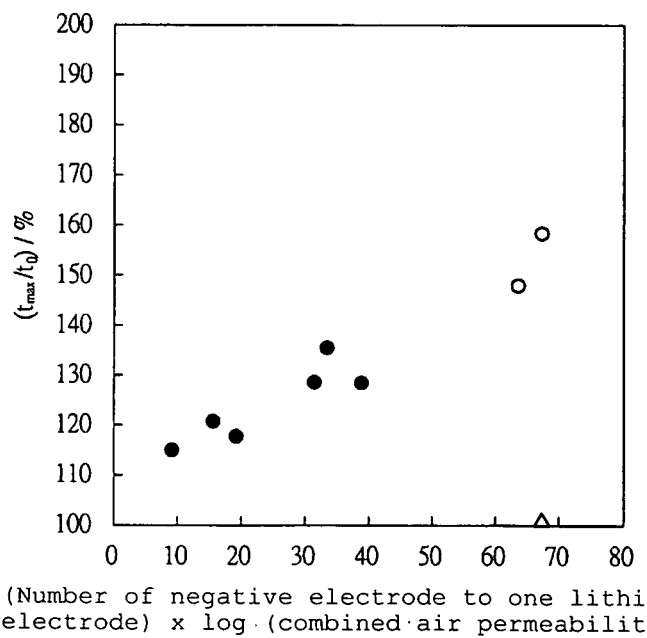
FIG. 13 is a diagram in which the numerical index X, which indicates the pre-doping speed of the lithium ions, and the maximum expansion rate of the cell during the pre-doping process of the lithium ions, are plotted.

FIG. 13 is a diagram in which the numerical index X, which indicates the pre-doping speed of the lithium ions and represents the manner of reducing the expansion of the electric storage device, and the maximum expansion rate tmax/t0 of the cell during the pre-doping process of the lithium ions, are plotted, like FIG. 12. FIG. 13 shows the results of the LIC cells in the Experimental Examples 10 to 15 and Comparative Examples 4 to 5, which used the negative electrode material that had the weight-average mesopore/macropore specific surface area of 11 m²/g for the negative electrode, and the result of the LIC cell in the Comparative Example 6, which used the negative electrode material that had the weight-average mesopore/macropore specific surface area of 5 m²/g for the negative electrode. In the figure, black circles indicate the LIC cells in the Experimental Examples 10 to 15, white circles indicate the LIC cells in the Comparative Examples 4 to 5, and a white triangle indicates the LIC cell in the Comparative Example 6.

From the respective results in FIGS. 12 and 13, it can be supposed that there is a correlation between the numerical index X, which indicates the pre-doping speed of the lithium ions and represents the manner of reducing the expansion of the electric storage device, and the maximum expansion rate tmax/t0 of the cell during the pre-doping process of the lithium ions. It is understood that, in the cells in which the negative electrode material has the equal weight-average mesopore/macropore specific surface area, the expansion of the cell caused by the generation of the reductive decomposition gas from the component of the electrolyte solution during the pre-doping process of the lithium ions can be reduced, when the numerical index X is set to be 50 or less. It is also understood that, when the numerical index X is set to be 40 or less, the expansion of the cell can more be reduced.

Although not shown with data, the effectiveness was confirmed, the effectiveness being obtained by setting the numerical index X within the specified range (X≤50), like FIGS. 12 and 13, when the weight-average mesopore/macropore specific surface area of the negative electrode material is 85 m²/g or less.

In the cell in the Comparative Example 6 in which the weight-average mesopore/macropore specific surface area is 5 m²/g, which is outside the specific range, the expansion of the cell is small, although the numerical index X is 67 that is great as in the Comparative Example 1 and the Comparative Example 5. When the weight-average mesopore/macropore specific surface area is outside the specific range, the extreme expansion of the cell does not occur due to the generation of the decomposed gas from the electrolyte solution during the pre-doping process of the lithium ions, as described above.

Although not shown with data, it is confirmed that the same result as in the Experimental Example 1 is obtained even in the case of using the electrolyte solution containing EC. Since, in the EC, the potential from which the generation of EC-derived lithium alkyl carbonate is started is higher than the potential from which the generation of the PC-derived lithium alkyl carbonate is started, the one using the electrolyte solution containing the EC tends to have a smaller absolute value of the expansion rate tmax/t0 of the cell than the one using the electrolyte solution containing the PC.

Figure 14:
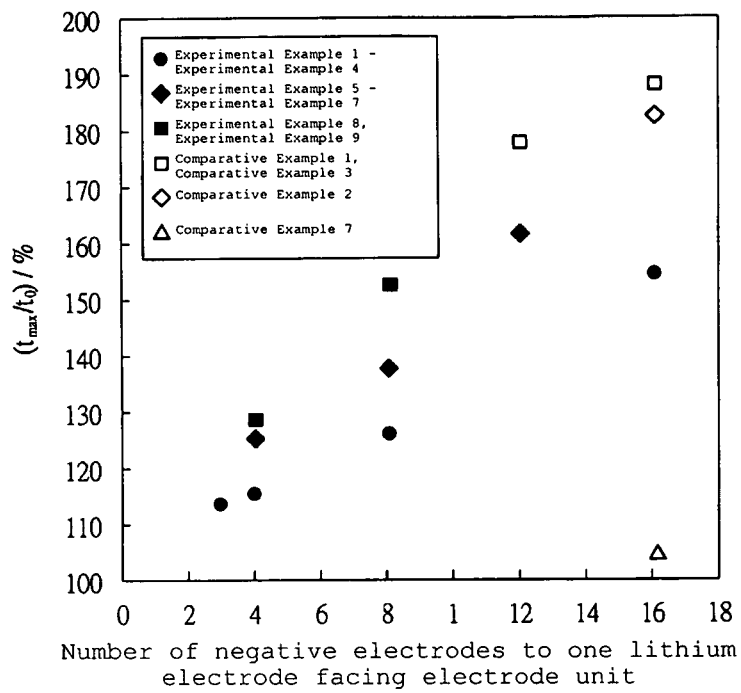
FIG. 14 is a diagram in which the number of the negative electrode layers to one lithium electrode and the maximum expansion rate of the cell during the pre-doping process of the lithium ions are plotted.

FIG. 14 is a diagram in which the axis of abscissa in FIG. 12 is changed to the number of negative electrode layers to one lithium electrode facing the electrode unit, i.e., a diagram in which the number of the negative electrode layers to one lithium electrode and the maximum expansion rate tmax/t0 of the cell during the pre-doping process of the lithium ions are plotted. In FIG. 14, the maximum expansion rates tmax/t0 are plotted with marks that are sorted for every cell having the equal combined air permeabilities.

From FIGS. 12 to 14, it is understood that the term of the number of the negative electrodes to one lithium electrode facing the electrode unit and the term of the combined air permeability in the equation of the numerical index X related to the pre-doping speed of the lithium ions, are related to the expansion of the cell. It can be said from FIGS. 12 to 14 that, since the term of the number of the negative electrode layers to one lithium electrode and the term of the combined air permeability are controlled, the expansion of the cell during the pre-doping process of the lithium ions is reduced and suppressed in case where the negative electrode material having the weight-average mesopore/macropore specific surface area within the specific range is used for the negative electrode.

Example 2

In Example 1, it has been described that the expansion of the cell, caused by the generation of the decomposed gas from the component of the electrolyte solution during the pre-doping process of the lithium ions in case where the negative electrode material having the weight-average mesopore/macropore specific surface area within the specific range is used for the negative electrode, can be reduced by setting the numerical index X to be 50 or less, or further, 40 or less. A further effectiveness to the expansion of the cell obtained by adopting the production process of the cell described in the embodiment is confirmed by Example 2 in addition to the effectiveness verified in Example 1. Like Example 1, the effectiveness will be described in detail according to the Experimental Examples based upon the experiment described below using the lithium ion capacitor.

Like Example 1, the same result was obtained for the lithium ion secondary battery, so that the description thereof as the Example is omitted.

Experimental Example 16

In the cell in the Experimental Example 1 in Example 1, the cell was held by two polypropylene plates (PP plates) having a size of 4.5×4.5 cm$^2$ and thickness of 5 mm, after being impregnated with electrolyte solution under reduced pressure. The PP plates were fixed with a double clip so as to apply pressure to the cell from the outside. The lithium electrode terminal and the negative electrode terminal are short-circuited to thereby start the pre-doping process of the lithium ions to the cell in this state. The cell was transferred to the atmosphere under reduced pressure with the lithium electrode terminal and the negative electrode terminal being short-circuited, and the resultant was kept in such a state for 16 hours.

After a predetermined time has been elapsed, the cell was returned to the original state from the reduced-pressure state. Then, the external pressure to the cell from the outside was stopped, and the short-circuit between the lithium electrode terminal and the negative electrode terminal was canceled. Thereafter, the cell was vacuum-sealed, whereby the lithium ion capacitor cell according to the Experimental Example 16 was completed. The lithium electrode terminal and the negative electrode terminal were short-circuited again to restart the pre-doping process of the lithium ions to the completed lithium ion capacitor cell.

Experimental Examples 17 to 24

Cells according to the Experimental Examples 17 to 24 in Example 2, which corresponded to the structures in the Experimental Examples 2 to 9 in Example 1, were completed by adopting the production process same as that in the Experimental Example 16 in the production process of the cell. The lithium electrode terminal and the negative electrode terminal were short-circuited again to restart the pre-doping process of the lithium ions to the completed lithium ion capacitor cells, like the Experimental Example 16.

Comparative Examples 7 to 10

Cells according to the Comparative Examples 7 to 10 in Example 2, which corresponded to the structures in the Comparative Examples 1 to 3 and 6 in Example 1, were completed by adopting the production process same as that in the Experimental Example 16 in the production process of the cell. The lithium electrode terminal and the negative electrode terminal were short-circuited again to restart the pre-doping process of the lithium ions to the completed lithium ion capacitor cells, like the Experimental Example 16.

Figure 15:
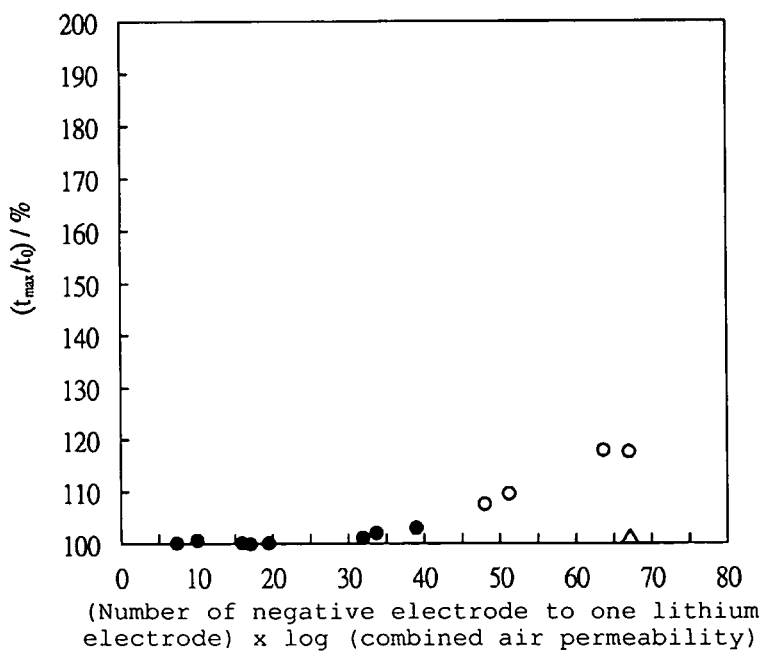
FIG. 15 is a diagram in which the numerical index X, which indicates the pre-doping speed of the lithium ions, and the maximum expansion rate of the cell during the pre-doping process of the lithium ions, are plotted.

FIG. 15 is, like FIG. 12, a diagram in which the numerical index X, which indicates the pre-doping speed of the lithium ions, and the maximum expansion rate tmax/t0 of the cell during the pre-doping process of the lithium ions, are plotted. FIG. 15 indicates the results of the LIC cells in the Experimental Examples 16 to 24 and the LIC cells in the Comparative Examples 7 to 10. In the figure, black circles indicate the LIC cells in the Experimental Examples 16 to 19 and the LIC cells in the Experimental Examples 21 to 24, white circles indicate the LIC cells in the Experimental Example 20 and Comparative Examples 7 to 9 and a white triangle indicates the LIC cell in the Comparative Example 10.

By adding the production process in Example 2, the maximum expansion rate tmax/t0 could be reduced for all cells as illustrated in FIG. 15. It can be confirmed that, by setting the numerical index X to be 50 or less, the maximum expansion rate of the cell caused by the generation of the decomposed gas from the component of the electrolyte solution during the pre-doping process of the lithium ions can be suppressed to be less than 10 percent. Further, when the numerical index X is set to be 40 or less, the period when the gas is generated (the cell is expanded) can be gathered within 24 hours from the start of the pre-dope of the lithium ions as illustrated in FIG. 11. Accordingly, when the numerical index X is set to be 40 or less and the production process in Example 2 is employed, the maximum expansion rate tmax/t0 caused by the generation of the decomposed gas from the component of the electrolyte solution during the pre-doping process of the lithium ions can be suppressed to be up to three percent or less as illustrated in FIG. 15.

Consequently, when the production process in Example 2 is added in the present invention, the expansion of the electric storage device, which is caused by the generation of the decomposed gas from the component of the electrolyte solution, can be reduced and suppressed during the pre-doping process of the lithium ions in case where the negative electrode material having the weight-average mesopore/macropore specific surface area within the specific range is used for the negative electrode.

As is illustrated in FIG. 11, when the numerical index X exceeded 50, the expansion of the cell was not stopped within about 24 hours from the start of the pre-doping process of the lithium ions. Therefore, even if the production process in Example 2 is employed, the effect of reducing the expansion of the cell is unsatisfactory. As described in Example 1, when the numerical index X exceeded 50, the pre-doping process of the lithium ions was not completed even after 2 weeks has elapsed from the start of the pre-doping process of the lithium ions. Therefore, the cells having the numerical index X more than 50 are undesirable from the viewpoint of productivity.

Example 3

In Example 3, lithium ion capacitor cells, each using a negative electrode material having different weight-average mesopore/macropore specific surface area for a negative electrode, were formed, and charging/discharging characteristics of these cells were evaluated. It is verified from Example 3 that the charging/discharging characteristic, particularly an input/output characteristic, is enhanced by setting the weight-average mesopore/macropore specific surface area of the negative electrode material within the specific range.

Experimental Example 25

A lithium ion capacitor cell according to the Experimental Example 25 was formed in the same manner as in the Experimental Example 15 except that the production process described in Example 2 was employed.

Experimental Example 26

Fabrication of Negative Electrode 4

A carbon black used for the negative electrode active material in the negative electrode 2 was used for the negative electrode. By a heating kneader, 100 parts by weight of the carbon black and 40 parts by weight of pitch were kneaded, and the resultant was burned under a non-oxidizing atmosphere at 800° C. The obtained carbon precursor was pulverized, and then, the resultant was burned again under the non-oxidizing atmosphere at 1000° C., thereby obtaining a negative electrode active material. The mesopore/macropore specific surface area of this material was 26 m$^2$/g.

Acetylene black (special pressed product HS-100) manufactured by Denki Kagaku Kogyo Kabushiki Kaisha, and having the mesopore/macropore specific surface area of 24 m$^2$/g, was prepared as a conductive material, like the negative electrode 1. 100 parts by weight of the above-mentioned active material and 7 parts by weight of the acetylene black were mixed to form a negative electrode precursor. The weight-average mesopore/macropore specific surface area of the carbon contained in the negative electrode was 26 m$^2$/g.

Carboxyl methyl cellulose, and latex of SBR rubber binder were mixed with the negative electrode precursor with water used as a solvent, to thereby prepare a slurry of a negative electrode 4. Both surfaces of a copper expanded metal having through-holes were coated with the slurry of the negative electrode 4 in such a manner that the electrode thickness became 75 μm, to thereby obtain a negative electrode. The obtained electrode was dried under reduced pressure.

[Fabrication of Cell]

A lithium ion capacitor cell according to the Experimental Example 26 was formed in the same manner as in the Experimental Example 18 except that the negative electrode 4 was used for the negative electrode. After the completion of the pre-doping process of the lithium ions, one cell of the plural LIC cells was disassembled, and the air permeabilities of the positive electrode, the negative electrode, and the separator were measured to acquire the combined air permeability. The combined air permeability was 273 seconds/100 mL. Accordingly, the numerical index X in the Experimental Example 26 was 10.

Comparative Example 11

A lithium ion capacitor cell according to the Comparative Example 11 was formed in the same manner as in the Experimental Example 18 except that the negative electrode 3 was used for the negative electrode. After the completion of the pre-doping process of the lithium ions, one cell of the plural LIC cells was disassembled, and the air permeabilities of the positive electrode, the negative electrode, and the separator were measured to acquire the combined air permeability. The combined air permeability was 479 seconds/100 mL. Accordingly, the numerical index X in the Comparative Example 11 was 11.

As described above, cells in which only the weight-average mesopore/macropore specific surface areas of the negative electrode material were different were formed according to the Experimental Examples 18, 25, and 26 and Comparative Example 11. After the completion of the pre-dope of the lithium ions, each cell was charged at a constant current of 0.4 A until the cell voltage reached 3.8 V, and then a constant voltage of 3.8 V was applied. The constant current-constant voltage charging method described above was performed for 30 minutes under the ambient temperature of 25° C. Then, the constant current-constant voltage discharging method was performed until the voltage reached 2.2 V, while changing the current value up to 25.0 A. As a result, a discharging load characteristic was acquired.

In the discharging characteristic acquired as described above, a current-voltage diagram in which the respective discharging current values are plotted on the axis of abscissa, and the voltage differences between the cell voltage immediately after the start of the discharge and the cell voltage one second after the start of the discharge in the respective load currents were plotted on the axis of ordinate, was formed. According to the least-square method, the discharging DC resistance was calculated from the slope of the approximate line of each plot passing the coordinate origin.

The cell whose discharging characteristic was acquired was discharged at a constant current of 0.4 A until the cell voltage reached 2.2 V, and then a constant voltage of 2.2 V was applied. The constant current-constant voltage discharging method described above was performed for 30 minutes. Then, the constant current-constant voltage charging method was performed until the voltage reached 3.8 V, while changing the current value up to 8.0 A. As a result, a charging load characteristic was acquired. The charging capacity and the discharging capacity with the lowest load were substantially equal to each other in all cells of the lithium ion capacitors.

In the charging characteristic acquired as described above, a current-voltage diagram in which the respective charging current values are plotted on the axis of abscissa, and the voltage differences between the cell voltage immediately after the start of the charge and the cell voltage one second after the start of the charge in the respective load currents were plotted on the axis of ordinate, was formed. According to the least-square method, the charging DC current resistance was calculated from the slope of the approximate line of each plot passing the coordinate origin.

FIG. 16 is a graph illustrating the discharging load characteristic and the charging load characteristic of each test cell at ambient temperature of 25° C.

FIG. 17 is a graph showing a discharging DC resistance and a charging DC resistance at an ambient temperature of 25° C.

In FIG. 16, it was confirmed that the discharging load characteristic and charging load characteristic were enhanced in the LIC cell of the Comparative Example 11 by setting the weight-average mesopore/macropore specific surface area of the negative electrode material to be within the specific range. In FIG. 17, it was confirmed that the discharging DC resistance and charging DC resistance could be reduced by setting the weight-average mesopore/macropore specific surface area of the negative electrode material to be within the specific range. The lithium ion capacitor using as the configuration of the Example draws a linear charging/discharging curve in a capacity-voltage diagram. Therefore, when the DC resistance is reduced, i.e., when the voltage drop immediately after the start of the charging/discharging is suppressed, much more charging/discharging capacity can be obtained upon the high-load charging/discharging.

Although not shown in Example 3 with data, the effectiveness, which was obtained by setting the weight-average mesopore/macropore specific surface area of the negative electrode material to be within the specific range, was confirmed, up to 85 m$^2$/g of the weight-average mesopore/macropore specific surface area of the negative electrode material.

When the Experimental Example 18 and the Experimental Example 26 were compared, the charging characteristic was excellent in the Experimental Example 26, although the weight-average mesopore/macropore specific surface area was greater in the cell in the Experimental Example 18 than in the cell in the Experimental Example 26. This is considered that the DC resistance, which could be reduced by increasing the weight-average mesopore/macropore specific surface area of the negative electrode material during the charging process, started to increase, when the weight-average mesopore/macropore specific surface area of the negative electrode material exceeded 35 m²/g. This can be confirmed from FIG. 17.

It can be confirmed from the result of the Example 3 that the charging/discharging characteristic, particularly the input/output characteristic, can be enhanced by setting the weight-average mesopore/macropore specific surface area of the negative electrode material to be within the range of 10 m²/g and 85 m²/g, more preferably within the range between 10 m²/g and 35 m²/g.

The invention made by the present inventors has been specifically described above on the basis of the embodiments. The present invention is not limited to the aforesaid embodiments, and various modifications are possible without departing from the scope of the present invention.

The present invention is well adaptable to a field of a pre-dope type electric storage device that may generate gas during the pre-doping process.

What is claimed is:

1. An electric storage device, comprising:
   an aprotic organic electrolyte solution comprising a lithium salt serving as electrolyte solution;
   an electrode unit comprising at least one positive electrode and a plurality of negative electrodes, the positive electrode and the negative electrodes being wound or stacked through a separator; and
   an ion source that supplies lithium ions, which are pre-doped into the negative electrodes,
   wherein a plurality of through-holes are formed on a current collector of the positive electrode and the negative electrodes,
   wherein the negative electrodes each comprise a negative electrode material that allows lithium ions to be doped thereinto or de-doped therefrom,
   wherein a mesopore/macropore specific surface area represented by a weight average of the negative electrodes' material is between 10 m²/g and 85 m²/g,
   wherein an index X, on a basis of a number of the negative electrodes per an opposite surface of the ion source facing the electrode unit and a combined air permeability, obtained by combining an average air permeability of the positive electrode, an average air permeability of the negative electrode, and an average air permeability of the separator, is represented by the following equation of:

$X$=(the number of the negative electrodes per the opposite surface of the ion source facing the electrode unit)×log(the combined air permeability), and wherein the index X is less than 50 and greater than 3.

2. The electric storage device according to claim 1, wherein the index X is in a range of 5 to 40.

3. The electric storage device according to claim 1, wherein the mesopore/macropore specific surface area represented by the weight average of the negative electrodes' material is 10 m²/g or more and 35 m²/g or less.

4. The electric storage device according to claim 1, further comprising an outer casing that accommodates the electrode unit,
   wherein the outer casing is kept opened under the negative pressure atmosphere for at least 2 hours or more from a start of the pre-doping process of the lithium ions to the negative electrodes.

5. The electric storage device according to claim 1, wherein the positive electrode comprises a positive electrode material that allows anions and lithium ions to be doped thereinto or de-doped therefrom.

6. The electric storage device according to claim 5, wherein the positive electrode material comprises an activated carbon.

7. The electric storage device according to claim 1, wherein the electric storage device comprises a lithium ion capacitor.

8. The electric storage device according to claim 1, wherein the electric storage device comprises a lithium ion secondary battery.

9. The electric storage device according to claim 1, wherein, in a stacked electrode unit the number of the negative electrodes per the opposite surface of the ion source facing the electrode unit is a number of the negative electrodes in the electrode unit.

10. The electric storage device according to claim 1, wherein, in a wound electrode unit the number of the negative electrodes per the opposite surface of the ion source facing the electrode unit is a number of turns of the wound electrode in the electrode unit.

11. A method of producing an electric storage device, the electric storage device comprising an aprotic organic electrolyte solution comprising a lithium salt serving as the electrolyte solution, an electrode unit comprising a positive electrode and a negative electrode, the positive electrode and the negative electrode being wound or stacked through a separator, and an ion source that supplies lithium ions, which are pre-doped into the negative electrode, the method comprising:
    forming the negative electrode by using a negative electrode material comprising a mesopore/macropore specific surface area represented by a weight average between 10 m²/g and 85 m²/g; and
    wherein an index is used based on a number of the negative electrodes per an opposite surface of the ion source facing the electrode unit and a combined air permeability, which is obtained by combining an average air permeability of the positive electrode, an average air permeability of the negative electrode, and an average air permeability of the separator.

12. A method of producing an electric storage device according to claim 11, further comprising keeping open, under a negative pressure atmosphere, an outer casing which accommodates the electrode unit for at least two hours or more from a start of the pre-doping process of the lithium ions.

13. The method of producing the electric storage device according to claim 11, wherein the index X is less than or equal to 50.

14. The method of producing the electric storage device according to claim 13, wherein the index X is in a range of 5 to 40.

15. A stacked-type electrode unit, comprising:
    a plurality of negative electrodes, the negative electrodes comprising a negative electrode material that allows lithium ions to be doped thereinto or de-doped therefrom, wherein a mesopore/macropore specific surface area represented by a weight average of the negative electrode material is between 10 m²/g and 85 m²/g;

at least one positive electrode;

at least one lithium electrode; and a plurality of separators, wherein a separator of the plurality of separators is provided between each of the at least one positive electrode and the plurality of negative electrodes and a separator is provided between each of the at least one lithium electrode and the negative electrodes, wherein the stacked type electrode unit is configured to have a value of an index X of less than 50 and greater than 3, said value of X being determined by a number of the plurality of negative electrodes and a combined air permeability, obtained by combining an average air permeability of the at least one positive electrode, an average air permeability of the plurality of negative electrodes, and an average air permeability of the at least one separator, said value X being X=(the number of the negative electrodes per the opposite surface of the ion source facing the electrode unit)×log(the combined air permeability).

16. The stacked-type electrode unit according to claim 15, wherein each of the at least one lithium electrode comprises:

a current collector; and a lithium metal mounted on the current collector.

17. The stacked-type electrode unit according to claim 15, wherein each of the at least one positive electrode comprises:

a current collector, said current collector being porous, a plurality of holes defined therein from a front side to a reverse side thereof;

a positive electrode mixture member formed on both the front side and the reverse side of the current collector; and a positive electrode terminal provided at the at least one positive electrode, said positive electrode terminal extending from the current collector.

18. The stacked-type electrode unit according to claim 15, wherein each of the plurality of negative electrodes comprises:

a current collector, said current collector being porous, a plurality of holes defined therein from a front side to a reverse side thereof;

a negative electrode mixture member formed on both the front side and the reverse side of the current collector; and a negative electrode terminal provided at each of the plurality of negative electrodes, said negative electrode terminal extending from the current collector.

19. The stacked-type electrode unit according to claim 18, wherein said plurality of negative electrodes comprise lithium ions pre-doped therein.

20. A wound-type electrode unit, comprising:

a negative electrode, the negative electrode comprising a negative electrode material that allows lithium ions to be doped thereinto or de-doped therefrom, wherein a mesopore/macropore specific surface area represented by a weight average of the negative electrode material is between 10 $m^2/g$ and 85 $m^2/g$;

a positive electrode;

a lithium electrode; and a plurality of separators, wherein a separator of the plurality of separators is provided between the positive electrode and the negative electrode and another separator of the plurality of separator is placed between the lithium electrode and the negative electrode, wherein the wound-type electrode unit is configured to have a value of an index X of less than 50 and greater than 3, said value of X being determined by a number of turns of the wound-type electrode unit and a combined air permeability, obtained by combining an average air permeability of the positive electrode, an average air permeability of the negative electrode, and an average air permeability of the separator, said value X being X=(the number of turns of the wound electrode)×log(the combined air permeability).

* * * * *